United States Patent
Hobbs et al.

(10) Patent No.: US 12,528,861 B2
(45) Date of Patent: Jan. 20, 2026

(54) ANTI-HUMAN-IL-1-β ANTIBODIES, ENCODING NUCLEIC ACIDS THEREOF AND METHODS OF USING THEREOF TO TREAT INFLAMMATORY DISEASES AND CANCER

(71) Applicant: ELI LILLY AND COMPANY, Indianapolis, IN (US)

(72) Inventors: Wendy Loza Hobbs, San Diego, CA (US); Andrew Dixon Skora, Solana Beach, CA (US)

(73) Assignee: Eli Lilly and Company, Indianapolis, IN (US)

( * ) Notice: Subject to any disclaimer, the term of this patent is extended or adjusted under 35 U.S.C. 154(b) by 780 days.

(21) Appl. No.: 17/759,059

(22) PCT Filed: Jan. 19, 2021

(86) PCT No.: PCT/US2021/013896
§ 371 (c)(1),
(2) Date: Jul. 19, 2022

(87) PCT Pub. No.: WO2021/150486
PCT Pub. Date: Jul. 29, 2021

(65) Prior Publication Data
US 2023/0057665 A1    Feb. 23, 2023

Related U.S. Application Data

(60) Provisional application No. 62/963,327, filed on Jan. 20, 2020.

(51) Int. Cl.
*C07K 16/24* (2006.01)
*A61K 39/00* (2006.01)

(52) U.S. Cl.
CPC ...... *C07K 16/245* (2013.01); *A61K 2039/505* (2013.01); *C07K 2317/21* (2013.01); *C07K 2317/565* (2013.01); *C07K 2317/74* (2013.01); *C07K 2317/76* (2013.01); *C07K 2317/77* (2013.01); *C07K 2317/92* (2013.01)

(58) Field of Classification Search
CPC .............. C07K 16/245; C07K 2317/21; C07K 2317/565; C07K 2317/74; C07K 2317/76; C07K 2317/77; C07K 2317/92; C07K 2317/33; C07K 2317/24; A61K 2039/505; A61P 9/10; A61P 9/00; A61P 37/06; A61P 29/00; A61P 35/00; G01N 33/6893; G01N 33/574; G01N 2333/7155; G01N 2800/32; G01N 2800/709
See application file for complete search history.

(56) References Cited

U.S. PATENT DOCUMENTS 7,714,120 B2  5/2010  Dickinson et al.

FOREIGN PATENT DOCUMENTS

| WO | 02/16436 A2 | 2/2002 |
| WO | 2007002261 A2 | 1/2007 |
| WO | 2007050607 A2 | 5/2007 |
| WO | 2014/068132 A1 | 5/2014 |
| WO | 2015/067636 A1 | 5/2015 |
| WO | 2019/118426 A1 | 6/2019 |

OTHER PUBLICATIONS

International Search Report and Written Opinion of PCT/US2021/013896 (filed Jan. 19, 2021 by Eli Lilly and Company) mailed on May 7, 2021 by the European Patent Office, X pages.
Ridker, P.M. et al., "Effect of interleukin-1beta inhibition with canakinumab on incident lung cancer in patients with atherosclerosis: exploratory results from a randomised, double-blind, placebo-controlled trial," Lancet 2017, vol. 390, 1833-1842.
Decision on Rejection, CN Application No. 202180009404.5, dated Aug. 17, 2024, 7 pages.
Office Action, PK Application No. 65/2021, dated Sep. 18, 2024, 2 pages.
Office Action, CN Application No. 202180009404.5, dated Jun. 7, 2024, 9 pages.
Search Report, CN Application No. 202180009404.5, dated Aug. 12, 2023, 2 pages.
Office Action, CN Application No. 202180009404.5, dated Aug. 12, 2023, 10 pages.
Office Action, JP Application No. 2022-543633, dated Sep. 5, 2023, 3 pages.
Response to Office Action, JP Application No. 2022-543633, dated Nov. 22, 2023, 2 pages.
Decision to Grant a Patent, JP Application No. 2022-543633, dated Nov. 28, 2023, 3 pages.
Office Action, TW Application No. 110101816, dated Mar. 28, 2022, 4 pages.
Examination Report, PK Application No. 65/2021, dated Feb. 14, 2022, 2 pages.
Response to Examination Report, PK Application No. 65/2021, dated Feb. 20, 2023, 2 pages.
Rondeau, J-M. et al., The molecular mode of action and species specificity of canakinumab, a human monoclonal antibody neutralizing IL-1β, mAbs, 2015, 1151-1160, 7:6.
Chien, C-H. et al., Local Immunosuppressive Microenvironment Enhances Migration of Melanoma Cells to Lungs in DJ-1 Knockout Mice, PLoS ONE, 2015, 20 pages, 10(2).
Dhimolea, E., Canakinumab, mAbs, 2010, 3-13, 2(1).

*Primary Examiner* — Robert S Landsman
(74) *Attorney, Agent, or Firm* — Nielsen IP Law LLC

(57) ABSTRACT

The present disclosure provides human engineered IL-1 beta antibodies, cells and vectors comprising DNA encoding the same, and methods for producing the antibodies. In addition, the present disclosure provides the use of the human engineered IL-1 beta antibodies for the treatment of inflammatory diseases such as cardiovascular disease and cancer.

24 Claims, No Drawings
Specification includes a Sequence Listing.

SEQUENCE LISTING

<160> NUMBER OF SEQ ID NOS: 20

<210> SEQ ID NO 1

```
<211> LENGTH: 269
<212> TYPE: PRT
<213> ORGANISM: Homo sapiens

<400> SEQUENCE: 1

Met Ala Glu Val Pro Glu Leu Ala Ser Glu Met Met Ala Tyr Tyr Ser
1               5                   10                  15

Gly Asn Glu Asp Asp Leu Phe Phe Glu Ala Asp Gly Pro Lys Gln Met
            20                  25                  30

Lys Cys Ser Phe Gln Asp Leu Asp Leu Cys Pro Leu Asp Gly Gly Ile
        35                  40                  45

Gln Leu Arg Ile Ser Asp His His Tyr Ser Lys Gly Phe Arg Gln Ala
    50                  55                  60

Ala Ser Val Val Val Ala Met Asp Lys Leu Arg Lys Met Leu Val Pro
65                  70                  75                  80

Cys Pro Gln Thr Phe Gln Glu Asn Asp Leu Ser Thr Phe Phe Pro Phe
                85                  90                  95

Ile Phe Glu Glu Glu Pro Ile Phe Phe Asp Thr Trp Asp Asn Glu Ala
            100                 105                 110

Tyr Val His Asp Ala Pro Val Arg Ser Leu Asn Cys Thr Leu Arg Asp
        115                 120                 125

Ser Gln Gln Lys Ser Leu Val Met Ser Gly Pro Tyr Glu Leu Lys Ala
    130                 135                 140

Leu His Leu Gln Gly Gln Asp Met Glu Gln Gln Val Val Phe Ser Met
145                 150                 155                 160

Ser Phe Val Gln Gly Glu Glu Ser Asn Asp Lys Ile Pro Val Ala Leu
                165                 170                 175

Gly Leu Lys Glu Lys Asn Leu Tyr Leu Ser Cys Val Leu Lys Asp Asp
            180                 185                 190

Lys Pro Thr Leu Gln Leu Glu Ser Val Asp Pro Lys Asn Tyr Pro Lys
        195                 200                 205

Lys Lys Met Glu Lys Arg Phe Val Phe Asn Lys Ile Glu Ile Asn Asn
    210                 215                 220

Lys Leu Glu Phe Glu Ser Ala Gln Phe Pro Asn Trp Tyr Ile Ser Thr
225                 230                 235                 240

Ser Gln Ala Glu Asn Met Pro Val Phe Leu Gly Gly Thr Lys Gly Gly
                245                 250                 255

Gln Asp Ile Thr Asp Phe Thr Met Gln Phe Val Ser Ser
            260                 265

<210> SEQ ID NO 2
<211> LENGTH: 449
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (1)..(1)
<223> OTHER INFORMATION: Xaa at position 1 is E or pyroglutamate
<220> FEATURE:
<221> NAME/KEY: MISC_FEATURE
<222> LOCATION: (118)..(118)
<223> OTHER INFORMATION: Xaa at position 118 is M or L

<400> SEQUENCE: 2

Xaa Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp His
```

```
                    20                  25                  30
Tyr Met Ser Trp Ile Arg Gln Ala Pro Gly Lys Gly Leu Glu Trp Val
            35                  40                  45
Ser Tyr Ile Ser Ser Ser Gly Ser Thr Ile Tyr Tyr Ala Asp Ser Val
        50                  55                  60
Lys Gly Arg Phe Thr Ile Ser Arg Asp Asn Ala Lys Asn Ser Leu Tyr
65                  70                  75                  80
Leu Gln Met Asn Ser Leu Arg Ala Glu Asp Thr Ala Val Tyr Tyr Cys
                85                  90                  95
Ala Arg Glu Ala Asp Ser Ser Gly Tyr Tyr Val Gly Val Asp Val
            100                 105                 110
Trp Gly Gln Gly Thr Xaa Val Thr Val Ser Ser Ala Ser Thr Lys Gly
        115                 120                 125
Pro Ser Val Phe Pro Leu Ala Pro Cys Ser Arg Ser Thr Ser Glu Ser
    130                 135                 140
Thr Ala Ala Leu Gly Cys Leu Val Lys Asp Tyr Phe Pro Glu Pro Val
145                 150                 155                 160
Thr Val Ser Trp Asn Ser Gly Ala Leu Thr Ser Gly Val His Thr Phe
                165                 170                 175
Pro Ala Val Leu Gln Ser Ser Gly Leu Tyr Ser Leu Ser Ser Val Val
            180                 185                 190
Thr Val Pro Ser Ser Ser Leu Gly Thr Lys Thr Tyr Thr Cys Asn Val
        195                 200                 205
Asp His Lys Pro Ser Asn Thr Lys Val Asp Lys Arg Val Glu Ser Lys
    210                 215                 220
Tyr Gly Pro Pro Cys Pro Cys Pro Ala Pro Glu Ala Ala Gly Gly
225                 230                 235                 240
Pro Ser Val Phe Leu Phe Pro Pro Lys Pro Lys Asp Thr Leu Met Ile
                245                 250                 255
Ser Arg Thr Pro Glu Val Thr Cys Val Val Val Asp Val Ser Gln Glu
            260                 265                 270
Asp Pro Glu Val Gln Phe Asn Trp Tyr Val Asp Gly Val Glu Val His
        275                 280                 285
Asn Ala Lys Thr Lys Pro Arg Glu Glu Gln Phe Asn Ser Thr Tyr Arg
    290                 295                 300
Val Val Ser Val Leu Thr Val Leu His Gln Asp Trp Leu Asn Gly Lys
305                 310                 315                 320
Glu Tyr Lys Cys Lys Val Ser Asn Lys Gly Leu Pro Ser Ser Ile Glu
                325                 330                 335
Lys Thr Ile Ser Lys Ala Lys Gly Gln Pro Arg Glu Pro Gln Val Tyr
            340                 345                 350
Thr Leu Pro Pro Ser Gln Glu Glu Met Thr Lys Asn Gln Val Ser Leu
        355                 360                 365
Thr Cys Leu Val Lys Gly Phe Tyr Pro Ser Asp Ile Ala Val Glu Trp
    370                 375                 380
Glu Ser Asn Gly Gln Pro Glu Asn Asn Tyr Lys Thr Thr Pro Pro Val
385                 390                 395                 400
Leu Asp Ser Asp Gly Ser Phe Phe Leu Tyr Ser Arg Leu Thr Val Asp
                405                 410                 415
Lys Ser Arg Trp Gln Glu Gly Asn Val Phe Ser Cys Ser Val Met His
            420                 425                 430
Glu Ala Leu His Asn His Tyr Thr Gln Lys Ser Leu Ser Leu Ser Leu
        435                 440                 445
```

Gly

<210> SEQ ID NO 3
<211> LENGTH: 1347
<212> TYPE: DNA
<213> ORGANISM: Artificial Sequence
<220> FEATURE:
<223> OTHER INFORMATION: Synthetic Construct

<400> SEQUENCE: 3

| | | | | | |
|---|---|---|---|---|---|
| gaggtgcagc | tggtggagtc | tgggggaggc | ttggtccagc | ctgggggtc | cctgaggctc | 60 |
| tcctgtgcag | cctctggatt | caccttcagt | gaccactaca | tgagctggat | ccgccaggct | 120 |
| ccagggaagg | ggctggagtg | ggtttcatac | attagtagta | gtggtagtac | catatactac | 180 |
| gcagactctg | tgaagggccg | attcaccatc | tccaggaca | acgccaagaa | ctcactgtat | 240 |
| ctgcaaatga | acagcctgag | agccgaggac | acggcggtgt | actactgcgc | cagagaggct | 300 |
| gacagcagcg | atactacta | cgtgggcgta | gacgtatggg | gtcagggtac | aatggtcacc | 360 |
| gtctcctcag | ccagcaccaa | gggcccatcg | gtcttcccac | tagcgccctg | ctccaggagc | 420 |
| acctccgaga | gcacagccgc | cctgggctgc | ctggtcaagg | actacttccc | cgagccggtg | 480 |
| acggtgtcgt | ggaactcagg | agccctgacc | agcggcgtgc | acaccttccc | ggctgtccta | 540 |
| cagtcctcag | gactctactc | cctcagcagc | gtggtgaccg | tgccctccag | cagcttgggc | 600 |
| acgaagacct | acacctgcaa | cgtagatcac | aagcccagca | acaccaaggt | ggacaagaga | 660 |
| gttgagtcca | aatatggtcc | cccatgccca | ccctgcccag | cacctgaggc | cgccggggga | 720 |
| ccatcagtct | tcctgttccc | cccaaaaccc | aaggacactc | tcatgatctc | ccggacccct | 780 |
| gaggtaacgt | gcgtggtggt | ggacgtgagc | caggaagacc | ccgaggtcca | gttcaactgg | 840 |
| tacgtggatg | gcgtggaggt | gcataatgcc | aagacaaagc | cgcgggagga | gcagttcaac | 900 |
| agcacgtacc | gtgtggtcag | cgtcctcacc | gtcctgcacc | aggactggct | gaacggcaag | 960 |
| gagtacaagt | gcaaggtctc | caacaaaggc | ctcccgtcct | ccatcgagaa | aaccatctcc | 1020 |
| aaagccaaag | gcagccccg | agagccacag | gtgtacaccc | tgcccccatc | ccaggaggag | 1080 |
| atgaccaaga | accaggtcag | cctgacctgc | ctggtcaaag | gcttctaccc | cagcgacatc | 1140 |
| gccgtggagt | gggaaagcaa | tgggcagccg | gagaacaact | acaagaccac | gcctcccgtg | 1200 |
| ctggactccg | acggctcctt | cttcctctac | agcaggctaa | ccgtggacaa | gagcaggtgg | 1260 |
| caggagggga | atgtcttctc | atgctccgtg | atgcatgagg | ctctgcacaa | ccactacaca | 1320 |
| cagaagagcc | tctccctgtc | tctgggt | | | | 1347 |

<210> SEQ ID NO 4
<211> LENGTH: 214
<212> TYPE: PRT
<213> ORGANISM: Artificial Sequence
<220> FEATURE:
<223> OTHER INFORMATION: Synthetic Construct

<400> SEQUENCE: 4

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Gly Ala Ser Ser Asp Gln Ser Gly Val Pro Ser Arg Phe Ser Gly

Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Gly Tyr Tyr Phe Pro Pro
                 85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 5
<211> LENGTH: 642
<212> TYPE: DNA
<213> ORGANISM: Artificial Sequence
<220> FEATURE:
<223> OTHER INFORMATION: Synthetic Construct

<400> SEQUENCE: 5
gacatccaga tgacccagtc tccatcctcc ctgtctgcat ctgtaggaga cagagtcacc        60
atcacttgcc gggcaagtca gagcattagc agctatttaa attggtatca gcagaaacca      120
gggaaagccc ctaagctcct gatctatggt gcatccagtg atcaaagtgg ggtcccatca      180
aggttcagtg gcagtggatc tgggacagat ttcactctca ccatcagcag tctgcaacct      240
gaagattttg caacttacta ctgtcagcaa ggatactact cccctcctac ttttggcgga      300
gggaccaagg ttgagatcaa acgaaccgtg gctgcaccat ctgtcttcat cttcccgcca      360
tctgatgagc agttgaaatc tggaactgcc tctgttgtgt gcctgctgaa taacttctat      420
cccagagagg ccaaagtaca gtggaaggtg gataacgccc tccaatcggg taactcccag      480
gagagtgtca cagagcagga cagcaaggac agcacctaca gcctcagcag caccctgacg      540
ctgagcaaag cagactacga gaaacacaaa gtctacgcct gcgaagtcac ccatcagggc      600
ctgagctcgc ccgtcacaaa gagcttcaac aggggagagt gc                          642

<210> SEQ ID NO 6
<211> LENGTH: 123
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (1)..(1)
<223> OTHER INFORMATION: Xaa at position 1 is E or pyroglutamate
<220> FEATURE:
<221> NAME/KEY: MISC_FEATURE
<222> LOCATION: (118)..(118)
<223> OTHER INFORMATION: Xaa at position 118 is M or L

<400> SEQUENCE: 6

Xaa Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp His
            20                  25                  30

Tyr Met Ser Trp Ile Arg Gln Ala Pro Gly Lys Gly Leu Glu Trp Val
        35                  40                  45

Ser Tyr Ile Ser Ser Ser Gly Ser Thr Ile Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Ala Asp Ser Ser Gly Tyr Tyr Tyr Val Gly Val Asp Val
            100                 105                 110

Trp Gly Gln Gly Thr Xaa Val Thr Val Ser Ser
        115                 120

<210> SEQ ID NO 7
<211> LENGTH: 13
<212> TYPE: PRT
<213> ORGANISM: Artificial Sequence
<220> FEATURE:
<223> OTHER INFORMATION: Synthetic Construct

<400> SEQUENCE: 7

Ala Ala Ser Gly Phe Thr Phe Ser Asp His Tyr Met Ser
1               5                   10

<210> SEQ ID NO 8
<211> LENGTH: 17
<212> TYPE: PRT
<213> ORGANISM: Artificial Sequence
<220> FEATURE:
<223> OTHER INFORMATION: Synthetic Construct

<400> SEQUENCE: 8

Tyr Ile Ser Ser Ser Gly Ser Thr Ile Tyr Tyr Ala Asp Ser Val Lys
1               5                   10                  15

Gly

<210> SEQ ID NO 9
<211> LENGTH: 16
<212> TYPE: PRT
<213> ORGANISM: Artificial Sequence
<220> FEATURE:
<223> OTHER INFORMATION: Synthetic Construct

<400> SEQUENCE: 9

Ala Arg Glu Ala Asp Ser Ser Gly Tyr Tyr Tyr Val Gly Val Asp Val
1               5                   10                  15

<210> SEQ ID NO 10
<211> LENGTH: 107
<212> TYPE: PRT
<213> ORGANISM: Artificial Sequence
<220> FEATURE:
<223> OTHER INFORMATION: Synthetic Construct

<400> SEQUENCE: 10

Asp Ile Gln Met Thr Gln Ser Pro Ser Ser Leu Ser Ala Ser Val Gly

```
               1               5                  10                 15
           Asp Arg Val Thr Ile Thr Cys Arg Ala Ser Gln Ser Ile Ser Ser Tyr
                          20                  25                 30

Leu Asn Trp Tyr Gln Gln Lys Pro Gly Lys Ala Pro Lys Leu Leu Ile
                          35                  40                 45

Tyr Gly Ala Ser Ser Asp Gln Ser Gly Val Pro Ser Arg Phe Ser Gly
                          50                  55                 60

Ser Gly Ser Gly Thr Asp Phe Thr Leu Thr Ile Ser Ser Leu Gln Pro
           65                  70                  75                 80

Glu Asp Phe Ala Thr Tyr Tyr Cys Gln Gln Gly Tyr Tyr Phe Pro Pro
                          85                  90                 95

Thr Phe Gly Gly Gly Thr Lys Val Glu Ile Lys
                         100                 105

<210> SEQ ID NO 11
<211> LENGTH: 11
<212> TYPE: PRT
<213> ORGANISM: Artificial Sequence
<220> FEATURE:
<223> OTHER INFORMATION: Synthetic Construct

<400> SEQUENCE: 11

Arg Ala Ser Gln Ser Ile Ser Ser Tyr Leu Asn
1               5                  10

<210> SEQ ID NO 12
<211> LENGTH: 8
<212> TYPE: PRT
<213> ORGANISM: Artificial Sequence
<220> FEATURE:
<223> OTHER INFORMATION: Synthetic Construct

<400> SEQUENCE: 12

Tyr Gly Ala Ser Ser Asp Gln Ser
1               5

<210> SEQ ID NO 13
<211> LENGTH: 9
<212> TYPE: PRT
<213> ORGANISM: Artificial Sequence
<220> FEATURE:
<223> OTHER INFORMATION: Synthetic Construct

<400> SEQUENCE: 13

Gln Gln Gly Tyr Tyr Phe Pro Pro Thr
1               5

<210> SEQ ID NO 14
<211> LENGTH: 153
<212> TYPE: PRT
<213> ORGANISM: Homo sapiens

<400> SEQUENCE: 14

Ala Pro Val Arg Ser Leu Asn Cys Thr Leu Arg Asp Ser Gln Gln Lys
1               5                  10                 15

Ser Leu Val Met Ser Gly Pro Tyr Glu Leu Lys Ala Leu His Leu Gln
               20                  25                 30

Gly Gln Asp Met Glu Gln Gln Val Val Phe Ser Met Ser Phe Val Gln
                35                  40                 45

Gly Glu Glu Ser Asn Asp Lys Ile Pro Val Ala Leu Gly Leu Lys Glu
           50                  55                 60
```

```
Lys Asn Leu Tyr Leu Ser Cys Val Leu Lys Asp Asp Lys Pro Thr Leu
 65                  70                  75                  80

Gln Leu Glu Ser Val Asp Pro Lys Asn Tyr Pro Lys Lys Met Glu
                 85                  90                  95

Lys Arg Phe Val Phe Asn Lys Ile Glu Ile Asn Asn Lys Leu Glu Phe
            100                 105                 110

Glu Ser Ala Gln Phe Pro Asn Trp Tyr Ile Ser Thr Ser Gln Ala Glu
            115                 120                 125

Asn Met Pro Val Phe Leu Gly Gly Thr Lys Gly Gly Asp Ile Thr
        130                 135                 140

Asp Phe Thr Met Gln Phe Val Ser Ser
145                 150
```

<210> SEQ ID NO 15
<211> LENGTH: 449
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (1)..(1)
<223> OTHER INFORMATION: Xaa at position 1 is E or pyroglutamate

<400> SEQUENCE: 15

```
Xaa Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Ser Asp His
             20                  25                  30

Tyr Met Ser Trp Ile Arg Gln Ala Pro Gly Lys Gly Leu Glu Trp Val
         35                  40                  45

Ser Tyr Ile Ser Ser Ser Gly Ser Thr Ile Tyr Tyr Ala Asp Ser Val
 50                  55                  60

Lys Gly Arg Phe Thr Ile Ser Arg Asp Asn Ala Lys Asn Ser Leu Tyr
 65                  70                  75                  80

Leu Gln Met Asn Ser Leu Arg Ala Glu Asp Thr Ala Val Tyr Tyr Cys
                 85                  90                  95

Ala Arg Glu Ala Asp Ser Ser Gly Tyr Tyr Val Gly Val Asp Val
            100                 105                 110

Trp Gly Gln Gly Thr Met Val Thr Val Ser Ser Ala Ser Thr Lys Gly
            115                 120                 125

Pro Ser Val Phe Pro Leu Ala Pro Cys Ser Arg Ser Thr Ser Glu Ser
        130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Lys Thr Tyr Thr Cys Asn Val
        195                 200                 205

Asp His Lys Pro Ser Asn Thr Lys Val Asp Lys Arg Val Glu Ser Lys
210                 215                 220

Tyr Gly Pro Pro Cys Pro Pro Cys Pro Ala Pro Glu Ala Ala Gly Gly
225                 230                 235                 240

Pro Ser Val Phe Leu Phe Pro Pro Lys Pro Lys Asp Thr Leu Met Ile
                245                 250                 255
```

```
Ser Arg Thr Pro Glu Val Thr Cys Val Val Val Asp Val Ser Gln Glu
            260                 265                 270

Asp Pro Glu Val Gln Phe Asn Trp Tyr Val Asp Gly Val Glu Val His
            275                 280                 285

Asn Ala Lys Thr Lys Pro Arg Glu Glu Gln Phe Asn Ser Thr Tyr Arg
            290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Gly Leu Pro Ser Ser Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Gln Glu Glu Met Thr Lys Asn Gln Val Ser Leu
            355                 360                 365

Thr Cys Leu Val Lys Gly Phe Tyr Pro Ser Asp Ile Ala Val Glu Trp
            370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Arg Leu Thr Val Asp
                405                 410                 415

Lys Ser Arg Trp Gln Glu Gly Asn Val Phe Ser Cys Ser Val Met His
            420                 425                 430

Glu Ala Leu His Asn His Tyr Thr Gln Lys Ser Leu Ser Leu Ser Leu
            435                 440                 445

Gly

<210> SEQ ID NO 16
<211> LENGTH: 449
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (1)..(1)
<223> OTHER INFORMATION: Xaa at position 1 is E or pyroglutamate

<400> SEQUENCE: 16

Xaa Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp His
            20                  25                  30

Tyr Met Ser Trp Ile Arg Gln Ala Pro Gly Lys Gly Leu Glu Trp Val
        35                  40                  45

Ser Tyr Ile Ser Ser Ser Gly Ser Thr Ile Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Ala Asp Ser Ser Gly Tyr Tyr Tyr Val Gly Val Asp Val
            100                 105                 110

Trp Gly Gln Gly Thr Leu Val Thr Val Ser Ser Ala Ser Thr Lys Gly
        115                 120                 125

Pro Ser Val Phe Pro Leu Ala Pro Cys Ser Arg Ser Thr Ser Glu Ser
    130                 135                 140
```

```
Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
            165                 170                 175

Pro Ala Val Leu Gln Ser Ser Gly Leu Tyr Ser Leu Ser Ser Val Val
        180                 185                 190

Thr Val Pro Ser Ser Ser Leu Gly Thr Lys Tyr Thr Cys Asn Val
    195                 200                 205

Asp His Lys Pro Ser Asn Thr Lys Val Asp Lys Arg Val Glu Ser Lys
    210                 215                 220

Tyr Gly Pro Pro Cys Pro Cys Pro Ala Pro Glu Ala Ala Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser Gln Glu
                260                 265                 270

Asp Pro Glu Val Gln Phe Asn Trp Tyr Val Asp Gly Val Glu Val His
            275                 280                 285

Asn Ala Lys Thr Lys Pro Arg Glu Glu Gln Phe Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Gly Leu Pro Ser Ser Ile Glu
                325                 330                 335

Lys Thr Ile Ser Lys Ala Lys Gly Gln Pro Arg Glu Pro Gln Val Tyr
                340                 345                 350

Thr Leu Pro Pro Ser Gln Glu Glu Met Thr Lys Asn Gln Val Ser Leu
            355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Arg Leu Thr Val Asp
                405                 410                 415

Lys Ser Arg Trp Gln Glu Gly Asn Val Phe Ser Cys Ser Val Met His
                420                 425                 430

Glu Ala Leu His Asn His Tyr Thr Gln Lys Ser Leu Ser Leu Ser Leu
            435                 440                 445

Gly

<210> SEQ ID NO 17
<211> LENGTH: 123
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (1)..(1)
<223> OTHER INFORMATION: Xaa at position 1 is E or pyroglutamate

<400> SEQUENCE: 17

Xaa Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp His
            20                  25                  30
```

```
Tyr Met Ser Trp Ile Arg Gln Ala Pro Gly Lys Gly Leu Glu Trp Val
            35                  40                  45

Ser Tyr Ile Ser Ser Gly Ser Thr Ile Tyr Tyr Ala Asp Ser Val
 50                  55                  60

Lys Gly Arg Phe Thr Ile Ser Arg Asp Asn Ala Lys Asn Ser Leu Tyr
 65                  70                  75                  80

Leu Gln Met Asn Ser Leu Arg Ala Glu Asp Thr Ala Val Tyr Tyr Cys
                 85                  90                  95

Ala Arg Glu Ala Asp Ser Ser Gly Tyr Tyr Tyr Val Gly Val Asp Val
                100                 105                 110

Trp Gly Gln Gly Thr Met Val Thr Val Ser Ser
            115                 120

<210> SEQ ID NO 18
<211> LENGTH: 123
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (1)..(1)
<223> OTHER INFORMATION: Xaa at position 1 is E or pyroglutamate

<400> SEQUENCE: 18

Xaa Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Ser Asp His
             20                  25                  30

Tyr Met Ser Trp Ile Arg Gln Ala Pro Gly Lys Gly Leu Glu Trp Val
            35                  40                  45

Ser Tyr Ile Ser Ser Gly Ser Thr Ile Tyr Tyr Ala Asp Ser Val
 50                  55                  60

Lys Gly Arg Phe Thr Ile Ser Arg Asp Asn Ala Lys Asn Ser Leu Tyr
 65                  70                  75                  80

Leu Gln Met Asn Ser Leu Arg Ala Glu Asp Thr Ala Val Tyr Tyr Cys
                 85                  90                  95

Ala Arg Glu Ala Asp Ser Ser Gly Tyr Tyr Tyr Val Gly Val Asp Val
                100                 105                 110

Trp Gly Gln Gly Thr Leu Val Thr Val Ser Ser
            115                 120

<210> SEQ ID NO 19
<211> LENGTH: 444
<212> TYPE: PRT
<213> ORGANISM: Artificial Sequence
<220> FEATURE:
<223> OTHER INFORMATION: Synthetic Construct

<400> SEQUENCE: 19

Gln Val Gln Leu Val Glu Ser Gly Gly Gly Val Val Gln Pro Gly Arg
 1               5                  10                  15

Ser Leu Arg Leu Ser Cys Ala Ala Ser Gly Phe Thr Phe Ser Val Tyr
             20                  25                  30

Gly Met Asn Trp Val Arg Gln Ala Pro Gly Lys Gly Leu Glu Trp Val
            35                  40                  45

Ala Ile Ile Trp Tyr Asp Gly Asp Asn Gln Tyr Tyr Ala Asp Ser Val
 50                  55                  60
```

Lys Gly Arg Phe Thr Ile Ser Arg Asp Asn Ser Lys Asn Thr Leu Tyr
 65                  70                  75                  80

Leu Gln Met Asn Gly Leu Arg Ala Glu Asp Thr Ala Val Tyr Tyr Cys
             85                  90                  95

Ala Arg Asp Leu Arg Thr Gly Pro Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Cys Ser Arg Ser Thr Ser Glu Ser Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Lys Thr Tyr Thr Cys Asn Val Asp His Lys Pro Ser
        195                 200                 205

Asn Thr Lys Val Asp Lys Arg Val Glu Ser Lys Tyr Gly Pro Pro Cys
    210                 215                 220

Pro Pro Cys Pro Ala Pro Glu Ala Ala Gly Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser Gln Glu Asp Pro Glu Val Gln
            260                 265                 270

Phe Asn Trp Tyr Val Asp Gly Val Glu Val His Asn Ala Lys Thr Lys
        275                 280                 285

Pro Arg Glu Glu Gln Phe Asn Ser Thr Tyr Arg Val Val Ser Val Leu
    290                 295                 300

Thr Val Leu His Gln Asp Trp Leu Asn Gly Lys Glu Tyr Lys Cys Lys
305                 310                 315                 320

Val Ser Asn Lys Gly Leu Pro Ser Ser Ile Glu Lys Thr Ile Ser Lys
                325                 330                 335

Ala Lys Gly Gln Pro Arg Glu Pro Gln Val Tyr Thr Leu Pro Pro Ser
            340                 345                 350

Gln Glu Glu Met Thr Lys Asn Gln Val Ser Leu Thr Cys Leu Val Lys
        355                 360                 365

Gly Phe Tyr Pro Ser Asp Ile Ala Val Glu Trp Glu Ser Asn Gly Gln
    370                 375                 380

Pro Glu Asn Asn Tyr Lys Thr Thr Pro Pro Val Leu Asp Ser Asp Gly
385                 390                 395                 400

Ser Phe Phe Leu Tyr Ser Arg Leu Thr Val Asp Lys Ser Arg Trp Gln
                405                 410                 415

Glu Gly Asn Val Phe Ser Cys Ser Val Met His Glu Ala Leu His Asn
            420                 425                 430

His Tyr Thr Gln Lys Ser Leu Ser Leu Ser Leu Gly
        435                 440

<210> SEQ ID NO 20
<211> LENGTH: 214
<212> TYPE: PRT
<213> ORGANISM: Artificial Sequence
<220> FEATURE:
<223> OTHER INFORMATION: Synthetic Construct

```
<400> SEQUENCE: 20

Glu Ile Val Leu Thr Gln Ser Pro Asp Phe Gln Ser Val Thr Pro Lys
1               5                   10                  15

Glu Lys Val Thr Ile Thr Cys Arg Ala Ser Gln Ser Ile Gly Ser Ser
                20                  25                  30

Leu His Trp Tyr Gln Gln Lys Pro Asp Gln Ser Pro Lys Leu Leu Ile
            35                  40                  45

Lys Tyr Ala Ser Gln Ser Phe Ser Gly Val Pro Ser Arg Phe Ser Gly
        50                  55                  60

Ser Gly Ser Gly Thr Asp Phe Thr Leu Thr Ile Asn Ser Leu Glu Ala
65                  70                  75                  80

Glu Asp Ala Ala Ala Tyr Tyr Cys His Gln Ser Ser Ser Leu Pro Phe
                85                  90                  95

Thr Phe Gly Pro Gly Thr Lys Val Asp Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
        130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
            195                 200                 205

Phe Asn Arg Gly Glu Cys
            210
```

ANTI-HUMAN-IL-1-β ANTIBODIES, ENCODING NUCLEIC ACIDS THEREOF AND METHODS OF USING THEREOF TO TREAT INFLAMMATORY DISEASES AND CANCER

CROSS-REFERENCE TO RELATED PATENT APPLICATIONS

This application is the US National Stage of International Application PCT/US2021/013896, filed on Jan. 19, 2021, which application claims the benefit of U.S. Provisional Application No. 62/963,327, filed on Jan. 20, 2020, the contents of which are incorporated herein by reference in their entireties.

REFERENCE TO A SEQUENCE LISTING SUBMITTED AS A TEXT FILE VIA EFS-WEB RELATED APPLICATIONS

This application is being filed electronically via EFS-Web and includes an electronically submitted Sequence Listing in .txt format. The .txt file contains a sequence listing entitled "2022-07-19_083389-01728_X22586_SequenceListing" created on Jul. 19, 2022 and having a size of 32,200 bytes. The Sequence Listing contained in this .txt file is part of the Specification and is incorporated herein by reference in its entirety.

BACKGROUND

The present disclosure relates to the field of medicine. More particularly, the present disclosure relates to antibodies that bind human IL-1β (IL-1 beta or IL-1β or Interleukin-1β have the same meaning herein) and may be useful for the treatment and/or prevention of inflammatory diseases, including but not limited to atherosclerotic cardiovascular disease (ASCVD), heart failure, cancer, and rare inherited disorders (such as inherited mutations that result in overproduction of IL-1β). The present disclosure also relates to methods of treating and/or preventing these inflammatory diseases.

Cardiovascular disease (CVD) is a class of diseases that involve the heart or blood vessels. Common manifestations of CVD include angina, myocardial infarction (MI, commonly known as a heart attack), stroke, heart failure, and arrythmia, among others. Because of the complex nature of the disease, many risk factors have been identified that contribute to initiation and progression of the disease. These include dyslipidemia, hypertension, diabetes, tobacco use, unhealthy diet, physical inactivity and obesity. However, despite the efforts in controlling these traditional risk factors, cardiovascular disease remains the leading cause of death in the US and worldwide.

Research in the last two decades has emphasized the inflammatory process as a key component in the pathogenesis of CVD, particularly atherosclerotic cardiovascular diseases (ASCVD). Epidemiologic data from the mid-1990s indicated that inflammation, as measured either by high-sensitivity C-reactive protein (hsCRP) or interleukin-6 (IL-6), was strongly associated with future major adverse cardiovascular events (MACE) in both primary and secondary prevention, independent of the traditional risk factors (Ridker et al. (2018) *J. Am. Coll. Cardiol.* 72: 3320-3331). Preclinical research has also demonstrated the role of inflammation in atherosclerotic plaque initiation and progression (Aday et al. (2019) *Front. Cardiovasc. Med.* 6: 16 doi: 10.3389/fcvm.2019.00016). Importantly, inflammation also contributes to plaque destabilization and rupture, precipitating acute cardiovascular events such as MI and stroke.

The Interleukin-1 family is a pivotal element of inflammation and has been well studied as a therapeutic target for various inflammatory diseases (Szekely et. al. (2018) *Cardiol. Ther.* 7: 25-44). There are three members of the IL-1 gene family: IL-1α, IL-1β, and IL-1 receptor antagonist (IL-1ra). IL-1α, and IL-1β are agonists of the IL-1 receptor whereas the IL-1ra is a specific receptor antagonist and thus, an endogenous competitive inhibitor of IL-1 (IL-1α or IL-1β). IL-1β is the primary circulating form of IL-1. It is produced as a precursor (pro-IL-1β) that is activated via the NLRP3 (NOD-, LRR- and pyrin domain-containing protein 3) inflammasome under a variety of inflammatory stimuli. Importantly, multiple factors known to associate with atherosclerosis have recently been found to activate the NLRP3 inflammasome. These include cholesterol crystals, athero-prone oscillatory flow, hypoxia, and neutrophil extracellular traps, supporting a critical role of the NLRP3 inflammasome-IL1β pathway in atherogenesis (Ridker (2016) *Circ. Res.* 118: 145-156).

The active form of IL-1β has autocrine, paracrine, and endocrine effects and, thus, is involved in a broad spectrum of inflammatory disorders. Rare inherited disorders, such as Muckle Wells Syndrome (MWS), cryopyrin-associated periodic syndrome (CAPS), and neonatal-onset multisystem inflammatory syndrome (NOMIS), are associated with overproduction of IL-1β, among others. Intervention with canakinumab (IL-1β antibody), anakinra (IL-1R antagonist) and rilonocept (IL-1 trap) all improve symptoms in these overproduction syndromes (Ridker (2016) *Circ. Res.* 118: 145-156).

IL-1β inhibition may also have a role in treatment of cancers that have an inflammatory basis. Many malignancies arise in areas of chronic inflammation, and inadequate resolution of inflammation could have a major role in tumor invasion, progression, and metastases (Grivennikov et al. (2010) *Cell* 140: 883-899). Inflammation is of pathophysiological relevance in lung cancer; for example, smoking and other external inhaled toxins trigger persistent inflammatory response. This inflammatory activation is partly mediated through activation of the NLRP3 inflammasome, with local generation of active IL-1β. In the clinic, high baseline concentrations of hsCRP and IL-6 have been found to be associated with subsequently diagnosed lung cancer. IL-1β blockade with canakinumab was associated with reduction in total cancer mortality, incident lung cancer and lung cancer mortality (Ridker et al. (2017) Lancet 390: 1833-1842).

Accordingly, the present disclosure may be useful for the treatment or prevention of a variety of cancers, including, but not limited to, lung cancer, for example, non-small cell lung cancer (NSCLC); breast cancer, for example, triple negative breast cancer (TNBC); prostate cancer, for example, metastatic prostate cancer; blood cancers, such as leukemia, lymphoma, myeloma, for example, low or intermediate risk myeloidysplastic leukemia; gastric cancer including esophogeal cancer; ovarian cancer, renal cancer, liver cancer, for example hepatocellular carcinoma (HCC); skin cancer, for example, melanoma; head and neck cancer; brain cancer; colorectal cancer; bladder cancer; pancreatic cancer; and kidney cancer, for example localized kidney cancer.

There remains a need to provide therapeutic antibodies that bind human IL-1β. In particular, there remains a need to provide IL-1β antibodies that have favorable clinical attributes.

SUMMARY

The present disclosure encompasses engineered human antibodies against human IL-1β. The antibodies of the present disclosure have one or more of the following properties: (1) bind human and cyno IL-1β with desirable binding affinities and/or association and dissociation rates; (2) potent IL-1β neutralizing activity; (3) high specificity for IL-1β; and (4) low immunogenicity risk.

The present disclosure provides engineered IL-1β antibodies and vectors comprising DNA encoding the same, and methods for producing the antibodies. In addition, the present disclosure provides the use of engineered IL-1β antibodies for the treatment of inflammatory diseases, such as cardiovascular disease and cancer, that may benefit from modulating e.g. antagonizing, IL-1β signaling and/or ameliorating the effects of overproduction of IL-1β.

Accordingly, in some embodiments, the present disclosure provides antibodies that bind human IL-1β protein, comprising a heavy chain variable region (VH) and a light chain variable region (VL), wherein the VH comprises heavy chain complementarity determining regions (HCDR) HCDR1, HCDR2, and HCDR3, and the VL comprises light chain complementarity determining regions (LCDR) LCDR1, LCDR2, and LCDR3, wherein

```
                                         (SEQ ID NO:7)
the HCDR1 comprises AASGFTFSDHYMS, (SEQ ID NO:8)
the HCDR2 comprises YISSSGSTIYYADSVKG, (SEQ ID NO:9)
the HCDR3 comprises AREADSSGYYYVGVDV, (SEQ ID NO: 11)
the LCDR1 comprises RASQSISSYLN, (SEQ ID NO: 12)
the LCDR2 comprises YGASSDQS, and (SEQ ID NO: 13)
the LCDR3 comprises QQGYYFPPT.
```

In some embodiments, the present disclosure provides an antibody, wherein the VH comprises SEQ ID NO:6 and the VL comprises SEQ ID NO:10. In other embodiments, the present disclosure provides an antibody, wherein the VH consists of SEQ ID NO:6 and the VL consists of SEQ ID NO:10.

In some embodiments, the present disclosure provides an antibody, wherein the VH comprises SEQ ID NO:17 or SEQ ID NO:18 and the VL comprises SEQ ID NO: 10. In other embodiments, the present disclosure provides an antibody, wherein the VH consists of SEQ ID NO:17 or SEQ ID NO:18 and the VL consists of SEQ ID NO:10.

In some embodiments, the present disclosure provides an antibody wherein the antibody comprises a heavy chain (HC) comprising SEQ ID NO:2 and a light chain (LC) comprising SEQ ID NO:4. In some embodiments, the antibody comprises a HC consisting of SEQ ID NO:2 and a LC consisting of SEQ ID NO:4.

In some embodiments, the present disclosure provides an antibody wherein the antibody comprises a heavy chain (HC) comprising SEQ ID NO:15 or SEQ ID NO:16 and a light chain (LC) comprising SEQ ID NO:4. In other embodiments, the present disclosure provides an antibody wherein the antibody comprises a heavy chain (HC) consisting of SEQ ID NO:15 or SEQ ID NO:16 and a light chain (LC) consisting of SEQ ID NO:4.

In some embodiments, the present disclosure provides an antibody, wherein the antibody comprises a heavy chain (HC) comprising amino acids 2-445 of SEQ ID NO:2, and a light chain (LC) comprising SEQ ID NO:4. In other embodiments, the present disclosure provides an antibody wherein the antibody comprises a heavy chain (HC) comprising amino acids 2-445 of SEQ ID NO:15 or SEQ ID NO:16 and a light chain (LC) comprising SEQ ID NO:4.

In some embodiments the epitope for an antibody is determined by obtaining an X-ray crystal structure of an antibody:antigen complex and identifying which residues on the antigen are within 4.5 Å of residues on the antibody of interest. In one embodiment, an antibody of the present invention binds to human IL-1β (SEQ ID NO:1) at an epitope comprising some or all of residues R120, E153, K219, E221, N224, M264, Q265, F266, and S268 of SEQ ID NO:1.

In some embodiments, the antibody has an engineered human IgG1 or IgG4 isotype.

In a preferred embodiment, the antibody has an engineered human IgG4 isotype.

In some embodiments, the present disclosure comprises a nucleic acid sequence encoding SEQ ID NO:2 or 4.

In some embodiments, the present disclosure comprises a nucleic acid sequence encoding SEQ ID NO:15 or 4.

In some embodiments, the present disclosure comprises a nucleic acid sequence encoding SEQ ID NO:16 or 4.

In some embodiments, the present disclosure provides a vector comprising a first nucleic acid sequence encoding SEQ ID NO:2 and a second nucleic acid sequence encoding SEQ ID NO:4.

In some embodiments, the present disclosure provides a vector comprising a first nucleic acid sequence encoding SEQ ID NO:15 and a second nucleic acid sequence encoding SEQ ID NO:4.

In some embodiments, the present disclosure provides a vector comprising a first nucleic acid sequence encoding SEQ ID NO:16 and a second nucleic acid sequence encoding SEQ ID NO:4.

In some embodiments, the present disclosure provides a first vector comprising a nucleic acid sequence encoding SEQ ID NO:2 and a second vector comprising a nucleic acid sequence encoding SEQ ID NO:4.

In some embodiments, the present disclosure provides a first vector comprising a nucleic acid sequence encoding SEQ ID NO:15 and a second vector comprising a nucleic acid sequence encoding SEQ ID NO:4.

In some embodiments, the present disclosure provides a first vector comprising a nucleic acid sequence encoding SEQ ID NO:16 and a second vector comprising a nucleic acid sequence encoding SEQ ID NO:4.

In some embodiments, the present disclosure provides a cell comprising the vector comprising a first nucleic acid sequence encoding SEQ ID NO:2 and a second nucleic acid sequence encoding SEQ ID NO:4.

In some embodiments, the present disclosure provides a cell comprising the vector comprising a first nucleic acid sequence encoding SEQ ID NO:15 and a second nucleic acid sequence encoding SEQ ID NO:4.

In some embodiments, the present disclosure provides a cell comprising the vector comprising a first nucleic acid sequence encoding SEQ ID NO:16 and a second nucleic acid sequence encoding SEQ ID NO:4.

In some embodiments, the present disclosure provides a cell comprising a first vector comprising a nucleic acid sequence encoding SEQ ID NO:2 and a second vector comprising a nucleic acid sequence encoding SEQ ID NO:4.

In some embodiments, the present disclosure provides a cell comprising a first vector comprising a nucleic acid sequence encoding SEQ ID NO:15 and a second vector comprising a nucleic acid sequence encoding SEQ ID NO:4.

In some embodiments, the present disclosure provides a cell comprising a first vector comprising a nucleic acid sequence encoding SEQ ID NO:16 and a second vector comprising a nucleic acid sequence encoding SEQ ID NO:4.

In an embodiment, the cell is a mammalian cell.

In an embodiment, the present disclosure provides a process of producing an antibody comprising culturing a cell as described above under conditions such that the antibody is expressed and recovering the expressed antibody from the culture medium.

In an embodiment, the present disclosure provides an antibody produced by culturing a cell as described above under conditions such that the antibody is expressed and recovering the expressed antibody from the culture medium.

In an embodiment, the present disclosure provides a pharmaceutical composition comprising an antibody of the present disclosure and a pharmaceutically acceptable excipient, diluent, or carrier.

In an embodiment, the present disclosure provides an antibody comprising two light chains and two heavy chains, wherein each light chain has the amino acid sequence given in SEQ ID NO:4 and each heavy chain has the amino acid sequence given in SEQ ID NO:2.

In an embodiment, the present disclosure provides an antibody comprising two light chains and two heavy chains, wherein each light chain has the amino acid sequence given in SEQ ID NO:4 and each heavy chain has the amino acid sequence given in SEQ ID NO:15 or SEQ ID NO:16.

In an embodiment, the present disclosure provides a method of preventing diseases, comprising administering the antibody of the present disclosure, and an acceptable carrier, diluent, or excipient. In a specific embodiment, the present disclosure provides a method of treating inflammatory diseases, wherein the inflammatory disease is selected from a list including, but not limited to, cardiovascular disease, cancer, Muckle Wells Syndrome (MWS), cryopyrin-associated periodic syndrome (CAPS), neonatal-onset multisystem inflammatory syndrome (NOMIS), rheumatoid arthritis, systemic-onset juvenile idiopathic arthritis (soJIA), gout arthritis, chronic obstructive pulmonary disease (COPD), Type 1 diabetes, Type 2 diabetes, familial cold auto-inflammatory syndrome (FCAS), and ocular diseases, for example, age-related macular degeneration.

In a specific embodiment, the present disclosure provides a method of treating cardiovascular disease, wherein the cardiovascular disease is selected from a list including, but not limited to, atherosclerotic cardiovascular disease (AS-CVD) or heart failure.

In a specific embodiment, the present disclosure provides a method of treating cancer, wherein the type of cancer is selected from a list including, but not limited to, lung cancer, for example, non-small cell lung cancer (NSCLC), triple negative breast cancer (TNBC), metastatic prostate cancer, low or intermediate risk myeloidoplastic leukemia, and localized kidney cancer.

In an embodiment, the present disclosure provides an antibody of the present disclosure, for use in therapy. In an embodiment, the present disclosure provides an antibody of the present disclosure, for use in the treatment of inflammatory disease. In an embodiment, the present disclosure provides an antibody of the present disclosure, for use in the treatment of cardiovascular disease. In an embodiment, the present disclosure provides an antibody of the present disclosure, for use in the treatment of cancer. In a further embodiment, the present disclosure provides an antibody of the present disclosure, for use in the treatment of an inflammatory disease, wherein the inflammatory disease is cardiovascular disease. In a further embodiment, the present disclosure provides an antibody of the present disclosure, for use in the treatment of an inflammatory disease, wherein the inflammatory disease is cancer.

In a further embodiment, the present disclosure provides the use of an antibody of the present disclosure for the manufacture of a medicament for the treatment of inflammatory disease. In a further embodiment, the present disclosure provides the use of an antibody of the present disclosure for the manufacture of a medicament for the treatment of cardiovascular disease or cancer.

DETAILED DESCRIPTION

As used herein, including the appended claims, the singular forms of words such as "a," "an," and "the," include their corresponding plural references unless the context clearly dictates otherwise.

As used herein, an "antibody" is an immunoglobulin polypeptide molecule that binds antigen. A full-length antibody as it exists naturally is an immunoglobulin molecule comprising 2 heavy (H) chains and 2 light (L) chains interconnected by disulfide bonds. The amino terminal portion of each chain includes a variable region of about 100-110 amino acids primarily responsible for antigen recognition via the complementarity determining regions (CDRs) contained therein. The carboxy-terminal portion of each chain defines a constant region primarily responsible for effector function.

The CDRs are interspersed with regions that are more conserved, termed framework regions (FR). Each light chain variable region (LCVR, also known as VL) and heavy chain variable region (HCVR, also known as VH) is composed of 3 CDRS and 4 FRs, arranged from amino-terminus to carboxy-terminus in the following order: FR1, CDR1, FR2, CDR2, FR3, CDR3, FR4. The 3 CDRs of the light chain are referred to as "LCDR1, LCDR2, and LCDR3" and the 3 CDRs of the heavy chain are referred to as "HCDR1, HCDR2, and HCDR3." The CDRs contain most of the residues which form specific interactions with the antigen. The numbering and positioning of CDR amino acid residues within the VL and VH regions in accordance with the well-known Kabat numbering convention.

Light chains are classified as kappa or lambda and are characterized by a particular constant region known in the art. Heavy chains are classified as gamma, mu, alpha, delta, or epsilon, and define the isotype of an antibody as IgG, IgM, IgA, IgD, or IgE, respectively. IgG antibodies can be further divided into subclasses, e.g., IgG1, IgG2, IgG3, IgG4. Each heavy chain type is characterized by a particular constant region with a sequence well known in the art.

In some biological systems and processes for producing, antibodies may undergo co- and post-translational modifications, such as glycosylation, deamidation, acylation, oxidation, cyclization, fucosylation, among other modifications that are well known in the art. Another known modification is cyclization of glutamine or glutamate to pyroglutamate (often abbreviated pyrGlu, pyrE, pGlu, or pE) at the N-terminus of the heavy chain variable region that comprises the heavy chain. Depending on the methods and antibodies used, the percentage of glutamate that is converted to pyroglutamate varies, and may represent a mixture, involve substantially all antibodies being produced, or a very low percentage of the antibodies.

As used herein, the term "monoclonal antibody" (mAb) refers to an antibody that is derived from a single copy or clone including, for example, any eukaryotic, prokaryotic, or phage clone, and not the method by which it is produced. mAbs of the present disclosure preferably exist in a homogenous or substantially homogenous population. Complete mAbs contain 2 heavy chain and 2 light chains. Monoclonal antibodies can be produced, for example, by hybridoma technologies, recombinant technologies, phage display technologies, synthetic technologies, e.g., CDR-grafting, or combinations of such or other technologies known in the art.

The phrase "engineered human" or "engineered human IL-1β antibodies" refers to monoclonal antibodies created and/or manipulated to have binding and functional properties according to the invention, bind to human IL-1β, and that have framework regions that are engineered to contain framework sequences substantially similar or identical to that of a human variant, which surrounds CDRs derived from a non-human antibody. Human and humanized antibodies are well known in the art. Engineered human antibodies herein may be intentionally modified as compared to native sequences, e.g., in the constant region, to change effector or other biofunctional characteristics, or biophysical characteristics such as stability, developability, and/or solubility, among others. Another embodiment herein includes engineered human antibodies that comprise fully human or substantially fully human heavy and/or light chain constant regions. Another embodiment herein includes an immunoglobulin molecule comprising 2 HCs and 2 LCs interconnected by disulfide bonds, including fully human or substantially fully human HC and LC constant regions.

"Antigen-binding fragments" of such human engineered antibodies include, for example, Fab fragments, Fab' fragments, F(ab')$_2$ fragments, and single chain Fv fragments.

"Framework region" or "framework sequence" refers to any one of framework regions 1 to 4. Human engineered antibodies and antigen-binding fragments thereof encompassed by the present disclosure include molecules wherein any one or more of framework regions 1 to 4 is substantially or fully human, i.e., wherein any of the possible combinations of individual substantially or fully human framework regions 1 to 4, is present. For example, this includes molecules in which framework region 1 and framework region 2, framework region 1 and framework region 3, framework region 1, 2, and 3, etc., are substantially or fully human. Substantially human frameworks are those that have at least about 80% sequence identity to a known human germline framework sequence. Human framework germline sequences can be obtained from ImMunoGeneTics (IMGT) or from *The* 20 *Immunoglobulin FactsBook* by Marie-Paule Lefranc and Gerard Lefranc, Academic Press, 2001, ISBN 012441351. For example, germline light chain frameworks can be selected from the group consisting of A11, A17, A18, A19, A20, A27, A30, L1, L11, L12, L2, L5, L15, L6, L8, O12, O2, and O8, and germline heavy chain framework regions can be selected from the group consisting of VH2-5, VH2-26, VH2-70, VH3-20, 25 VH3-72, VH1-46, VH3-9, VH3-66, VH3-74, VH4-31, VH1-18, VH1-69, VI-13-7, VH3-11, VH3-15, VH3-21, VH3-23, VH3-30, VH3-48, VH4-39, VH4-59, and VH5-51.

"IL-1β" (also known as IL-1 beta or IL-1β or Interleukin-1β) as used herein refers to the primary circulating form of IL-1. It is produced as a pre-cursor (pro-IL-1β or IL-1β proprotein) that is activated via the NLRP3 inflammasome under a variety of inflammatory diseases. Human pro-IL-1β comprises an amino acid sequence of SEQ ID NO:1 or a variant thereof. Mature human IL-1β protein comprises an amino acid sequence of SEQ ID NO:14 or a variant thereof.

"Inflammatory" as used herein includes both inflammatory and autoinflammatory diseases. The term "inflammatory disease" or "inflammatory diseases" includes, but is not limited to, cardiovascular disease, cancer, rare inherited disorders that result in the overproduction of IL-1β, and other diseases that may benefit from modulating, e.g. antagonizing, IL-1β signaling. "Inflammatory disease" may include, but is not limited to, cardiovascular disease, heart failure, cancer, Muckle Wells Syndrome (MWS), cryopyrin-associated periodic syndrome (CAPS), neonatal-onset multisystem inflammatory syndrome (NOMIS), rheumatoid arthritis, systemic-onset juvenile idiopathic arthritis (soJIA), gout arthritis, chronic obstructive pulmonary disease (COPD), Type 1 diabetes, Type 2 diabetes, familial cold auto-inflammatory syndrome (FCAS), and ocular diseases, including, for example, age-related macular degeneration.

The term "cardiovascular disease" herein refers to a class of diseases that involves the heart or blood vessels. A non-exhaustive list of manifestations of CVD includes, but is not limited to, angina, myocardial infarction (MI, commonly known as heart attack), stroke, heart failure, and arrythmia.

The term "cancer" herein refers to a group of diseases involving abnormal cell growth with the potential to invade or spread to other parts of the body. A non-exhaustive list of types of cancer includes, but is not limited to, lung cancer, for example, non-small cell lung cancer (NSCLC), triple negative breast cancer (TNBC), metastatic prostate cancer, low or intermediate risk myeloidoplastic leukemia, and localized kidney cancer. Thus, cancer may involve cells from solid tissue or organs, such as brain, breast, colorectal, skin, liver, kidney, lung, pancreatic, prostate, head and neck, ovary, uterus, bladder, stomach (gastric including esophageal); connective tissue, such as sarcomas or bone cancers; or the blood, such as lymphomas, leukemias, and myelomas. Cancers may also be described by their cellular origin, such as a carcinoma which originates in epithelial cells in various parts of the body, or adenoma, which originates in glands.

"Treatment" as it applies to an animal, human, experimental subject, cell, tissue, organ, or biological fluid, refers to contact of an exogenous pharmaceutical, therapeutic, or composition to the animal, human, subject, cell, tissue, organ, or biological fluid. The term "treatment" (or "treat" or "treating") as it applies to a human or research subject, refers to processes involving a slowing, interrupting, arresting, controlling, stopping, reducing, or reversing the progression or severity of a symptom, disorder, condition, or disease associated with IL-1β activity, but does not necessarily involve a total elimination of all disease-related symptoms, conditions, or disorders associated with IL-1β activity. "Treatment" (or "treat" or "treating") as it applies to pharmacokinetic, diagnostic, research, and experimental methods encompasses contact of a reagent to the cell, as well as contact of a reagent to a fluid, where the fluid is in contact with the cell. The term "preventing" (or "prevent") refers to keep something from happening, existing, or occurring and/or to hinder or stop from doing something.

The term "activation" can refer to cell activation as regulated by internal mechanisms as well as by external or environmental factors.

"Activity" of a molecule may describe or refer to the binding of the molecule to a ligand or to a receptor, to catalytic activity; to the ability to stimulate gene expression or cell signaling, differentiation, or maturation; to antigenic activity, to the modulation of activities of other molecules, and the like. "Activity" of a molecule may also refer to activity in modulating or maintaining cell-to-cell interactions, e.g., adhesion, or activity maintaining a structure of a cell, e.g., cell membranes or cytoskeleton. "Activity" can also mean specific activity, e.g., [catalytic activity]/[mg protein], or [immunological activity]/[mg protein], concentration in a biological compartment, or the like.

Engineered human antibodies in addition to those disclosed herein exhibiting similar functional properties according to the present disclosure can be generated using several different methods. The specific antibody compounds disclosed herein can be used as templates or parent antibody compounds to prepare additional antibody compounds. In one approach, the parent antibody compound CDRs are grafted into a human framework that has a high sequence identity with the parent antibody compound framework. The sequence identity of the new framework will generally be at least about 80%, at least about 85%, at least about 90%, at least about 95%, or at least about 99% identical to the sequence of the corresponding framework in the parent antibody compound. This grafting may result in a reduction in binding affinity compared to that of the parent antibody. If this is the case, the framework can be back-mutated to the parent framework at certain positions based on specific criteria disclosed by Queen et al. Al (1991) *Proc. Natl. Acad. Sci US* 88:2869. Additional references describing methods useful in humanizing antibodies include U.S. Pat. Nos. 4,816,397; 5,225,539, and 5,693,761; computer programs ABMOD and ENCAD as described in Levitt (1983) *J Mol. Biol.* 168: 595-620; and the method of Winter and co-workers (Jones et Al. (1986) *Nature* 321:522-525; Riechmann et al. (1988) Nature 332:323-327; and Verhoeyen et al. (1988) *Science* 239:1534-1536.

The identification of residues to consider for back-mutation can be carried out as follows:

When an amino acid falls into a category in which the amino acid in the human framework region of the acceptor framework is unusual for human frameworks at that position, whereas the corresponding amino acid in the donor immunoglobulin is typical for human frameworks at that position, the framework amino acid of the human germ-line sequence that is being used (the "acceptor framework") is replaced by a framework amino acid from a framework of the parent antibody compound (the "donor framework").

When each of the amino acids in the human framework region of the acceptor framework and a corresponding amino acid in the donor framework is generally unusual for human frameworks at that position, such amino acid can be replaced by an amino acid typical for human frameworks at that position. This back-mutation criterion enables one to recover the activity of the parent antibody compound.

Another approach to generating engineered human antibodies exhibiting similar functional properties to the antibody compounds disclosed herein involves randomly mutating amino acids within the grafted CDRs without changing the framework and screening the resultant molecules for binding affinity and other functional properties that are as good as, or better than, those of the parent antibody compounds. Single mutations can also be introduced at each amino acid position within each CDR, followed by assessing the effects of such mutations on binding affinity and other functional properties. Single mutations producing improved properties can be combined to assess their effects in combination with one another.

Further, a combination of both of the foregoing approaches is possible. After CDR grafting, one can back-mutate specific framework regions in addition to introducing amino acid changes in the CDRs. This methodology is described in Wu et al, (1999) *J Mol. Biol.* 294: 151-162.

The engineered human antibodies of the present disclosure can be used as medicaments in human medicine, administered by a variety of routes. Most preferably, such compositions are for parenteral administration. Such pharmaceutical compositions can be prepared by methods well known in the art (See, e.g., Remington: *The Science and Practice of Pharmacy;* 19th ed. (1995), A. Gennaro et al., Mack Publishing Co.) and comprise an engineered human antibody as disclosed herein, and a pharmaceutically acceptable carrier, diluent, or excipient.

The results of the following assays demonstrate that the exemplified monoclonal antibodies and antigen-binding fragments thereof of the present disclosure bind and/or neutralize IL-1$\beta$ and therefore may be used for treating inflammatory diseases such as cardiovascular disease or cancer.

EXAMPLES

Example 1: Antibody Expression and Purification

Significant problems with chemical and physical stability were encountered when constructing an anti-IL-1$\beta$ antibody of the present disclosure. For example, problems encountered with initial constructs included low binding affinity, variable region deamidation, oxidation, and low potency.

There were significant problems with binding affinity and chemical and physical stability to overcome, and the chemical and physical modifications of the present disclosure surprisingly overcame these problems. Amino acid modifications were introduced throughout both the heavy and light chains. The antibodies of the present disclosure include multiple residue changes from original constructs, are identified as possessing high binding affinity and being chemically and physically stable. None of the modifications comprising the antibody of the present disclosure were identified in the initial construct.

Exemplified antibodies of the present disclosure are presented in Table 1.

The antibodies of the present disclosure can be made and purified as follows. An appropriate host cell, such as HEK 293 or CHO, is either transiently transfected with an expression system for secreting antibodies using an optimal predetermined HC:LC vector ratio encoding sequences of Antibody I_HC or Antibody II_HC and a common LC sequence of antibodies I and II respectively. Clarified media, into which the antibody has been secreted, is purified using any of many commonly used techniques. For example, the medium may be conveniently applied to a Protein A or G column that has been equilibrated with a compatible buffer, such as phosphate buffered saline (pH 7.4). The column is washed to remove nonspecific binding components. The bound antibody is eluted, for example, by pH gradient (such as 0.1 M sodium phosphate buffer pH 6.8 to 0.1 M sodium citrate buffer pH 2.5). Antibody fractions are detected, such as by SDS-PAGE, and then are pooled. Further purification is optional, depending on the intended use. The antibody may be concentrated and/or sterile filtered using common techniques. Soluble aggregate and multimers may be effectively removed by common techniques, including size exclusion, hydrophobic interaction, or ion exchange chromatography. The purity of the antibody after these chromatography steps is greater than 99%. The product may be immediately frozen at −70° C. or may be lyophilized or preserved in 4° C. for immediate use.

Example 2: Antibody Discovery and Engineering

A panel of human anti-IL-1β antibodies are obtained using fully human yeast display libraries and screened to identify reagents that could be effective IL-1β neutralizing antibodies. Mutations are systematically introduced into individual complementarity determining regions (CDRs) of each antibody and the resulting variants are subjected to multiple rounds of selection with decreasing concentrations of antigen and/or increasing periods of dissociation to isolate clones with improved affinities. The sequences of individual variants are determined and may be used to construct a combinatorial library which is subjected to an additional round of selection with increased stringency to identify additive or synergistic mutational pairings between the individual CDR regions. Individual combinatorial clones are sequenced and binding characteristics are determined. Selected antibodies can also be mutagenized to fix post-translational modifications such as methionine oxidation while still retaining binding affinity to IL-1β. Additionally, framework (FW) substitutions are made to the antibody to revert these FW1 sequences to their germline state in order to reduce potential immunogenicity.

Engineered and/or optimized anti-IL-1β antibodies referred to herein as Antibody I and Antibody II are obtained, having the amino acid sequences of the variable regions of the heavy chain and light chain, and the complete heavy chain and light chain amino acid sequences, and the nucleotide sequences encoding the same, as listed in the section entitled "Amino Acid and Nucleotide Sequences." The sequence IDs corresponding to these fragments are shown below in Table 1, as well as the light chain and heavy chain CDR amino acid sequences.

TABLE 1

|  | Antibody I (SEQ ID NO) | Antibody II (SEQ ID NO) |
| --- | --- | --- |
| VH | 17 | 18 |
| VL | 10 | 10 |
| HC | 15 | 16 |
| LC | 4 | 4 |
| HC CDR1 | 7 | 7 |
| HC CDR2 | 8 | 8 |
| HC CDR3 | 9 | 9 |
| LC CDR1 | 11 | 11 |
| LC CDR2 | 12 | 12 |
| LC CDR3 | 13 | 13 |

Example 3: Neutralization of Human or Cyno IL-1β In Vitro

Recombinant human or cyno IL-1β are produced in *E. coli*, as N-terminal HIS-SUMO fusion protein. The protein is purified using HisPur Ni-NTA chromatography and followed by endotoxin removal. The purified fusion protein is then treated with SUMO protease Ulp1 to cleave the HIS-SUMO off the fusion protein. The cleaved HIS-SUMO protein is then removed from the reaction by HisPur Ni-NTA, and the untagged IL-1β is further purified to homogeneity using Superdex 75 size-exclusion chromatography.

The antibodies of the present disclosure are expected to neutralize IL-1β. Neutralization of IL-1β activity by Antibody I and/or Antibody II may be assessed by one or more IL-1β cell-based activity assays, for example, as described below.

Screening for neutralizers of IL-1β/IL-1R binding may initially be done through a high-throughput cell-based assay using HeLa cells expressing a Luciferase gene under control of a NF-κB promoter. This assay uses NF-κB-Luciferase reporter signal as a readout of recombinant IL-1β induced signaling. Neutralization of IL-1β is then quantified by measuring the level of reduction of Luciferase activity upon titration of anti-IL-1β antibodies. Alternatively, another in vitro neutralization assay such as a HEK-Blue cell-based assay is described in detail below.

Specifically, HEK-Blue™ IL-1β cells are cultured in a T-75 flask in growth medium (DMEM, 4.5 g/l glucose, 2 mM L-Glutamine, 10% (v/v) fetal bovine serum, 50 U/mL penicillin, 50 µg/mL streptomycin, 100 µg/mL Normocin™, 100 µg/mL Zeocin™ and 200 µg/mL Hygromycin B Gold) until 90% confluence. Cells are washed with PBS (without $Ca^{++}$ and $Mg^{++}$) twice and incubated in 1 mL of PBS for 2 minutes. Cells are then detached by patting on the side of the flask, resuspended with 10 mL test medium (DMEM, 4.5 g/l glucose, 2 mM L-Glutamine, 10% (v/v) heat-inactivated FBS (30 min at 56° C.), 50 U/mL penicillin, 50 µg/mL streptomycin, 100 µg/mL Normocin™), counted and diluted to $0.33 \times 10^6$ cells/mL with test medium. Recombinant human or cyno IL-1β and test articles are prepared to the desired concentrations in test medium. 40 L of antibody (5× concentration) is mixed with 10 µL of IL-1β (20× concentration, final concentration in assay is 4 pM) in a BioCoat poly-D-lysine plate (Corning 354461) and is incubated at room temperature for 30 minutes. 150 µL of HEK-Blue™ IL-1β cell suspension at $0.33 \times 10^6$ cells/mL is dispensed to each well of the poly-D-lysine plate containing antibody and IL-1β mixture. The plate is incubated at 37° C., 5% CO2 and 90% relative humidity overnight. On the second day, 25 µL culture medium from the poly-D-lysine plate is transferred to a Costar® assay plate (Corning 3695). 75 µL of QUANTI-Blue detection solution (Invivogen Catalog #rep-qb1, rep-qb2) pre-warmed to 37° C. is added to the assay plate. The assay plate is covered and incubated at 37° C. for 1 hour before reading on a plate reader (SpectraMax® Plus, Molecular Device) at $OD_{650}$ nm. Data is normalized and expressed as percent inhibition of 4 pM IL-1β: 0% Inhibition=4 pM IL-1β, 100% Inhibition=0 pM IL-1β. Neutralizing anti-hIL-16 antibodies blocks the activity of recombinant human IL-1β to stimulate HEK-Blue™ IL-1β cells. Relative potencies of the neutralizing antibodies are calculated using a 4-parameter logistic fit and expressed in IC50 values.

TABLE 2

Neutralization of human or cyno IL-1β in vitro

| Antibody | Human IL-1β Inhibition $IC_{50}$ (pM) | SD (pM) | Cyno IL-1β Inhibition $IC_{50}$ (pM) | SD (pM) |
| --- | --- | --- | --- | --- |
| Canakinumab | 29.17 | 1.04 | >10000 | NA |
| Antibody I | 30.20 | 1.95 | 33.89 | 1.24 |
| Antibody II | 28.69 | 1.17 | 31.52 | 3.25 |

NA: not applicable

Example 4: Neutralization of Human IL-1β In Vivo

Human IL-1β can bind to and stimulate the mouse IL-1 receptor, leading to an elevation of mouse cytokine IL-6 in serum. Time and dose ranging studies are undertaken to identify the optimal dose of human IL-1β and the optimal time for induction of mouse IL-6. To test in vivo neutralizing activities of the antibodies of the present disclosure, an optimized protocol is described below. Specifically, male C57BL/6 mice from Envigo are used for the study at approximately 9 weeks of age. Mice are fed a normal chow diet (Harlan Teklad diet, 2014) and randomized to treatment groups by body weight (n=5-8/group). Antibodies of the present disclosure and control antibodies are dissolved in saline and administered subcutaneously at dose levels as indicated. Twenty-four hours later, human IL-1β is dissolved in saline and is dosed intraperitoneally at 1 μg/kg dose level. Two hours later, blood samples are collected via retro orbital bleeding followed by centrifugation at 2000 g for 3 minutes to isolate serum samples.

Mouse IL-6 levels in serum are determined using the V-PLEX Mouse IL-6 kit (Meso Scale Discovery, Cat #K152QXD-2) following the manufacturer's instructions. Briefly, an MSD plate is washed 3 times with 150 μL Wash buffer. 50 μL of previously prepared calibrators (serial dilution), control and test samples (1:10 dilution) are transferred to appropriate wells on the plate, followed by 2 hours of shaking (500~1000 rpm) at room temperature. The plate is washed 3 times with 150 μL Wash buffer. 25 μL of Detection Antibody solution is then added to each well, followed by 2 hours of shaking (500~1000 rpm) at room temperature. The plate is washed 3 times with 150 μL Wash buffer. 150 μL of 2× Read Buffer is added to each well. The plate is immediately read on an MSD SQ120 plate reader. IL-6 concentrations of the test samples are analyzed from the calibration curve using a 4-parameter logistic fit.

Isotype matched control antibody (IgG4-PAA) is used as negative control for the study. Data are calculated as percent inhibition compared to mean IL-6 level of the control group. Statistical significance for the difference of means is assessed using one-way ANOVA, Dunnett's post-hoc with JMP11 software. Antibodies of the present disclosure dose dependently block the effects of human IL-1β to stimulate the mouse IL-1 receptor-mediated increase of mouse IL-6 (Tables 3-1, 3-2).

TABLE 3-1

Neutralization of human IL-1β in vivo using Antibody I

| Molecules | Dose level (μg/kg) | % inhibition vs IgG4-PAA control | SE (of % inhibition) |
|---|---|---|---|
| IgG4-PAA control | 4000 | 0.0 | 12.2 |
| Canakinumab | 60 | 14.9 | 10.3 |
| Canakinumab | 200 | 10.2 | 15.9 |
| Canakinumab | 600 | −54.6 | 11.3 |
| Canakinumab | 2000 | −86.6 | 2.8 |
| Canakinumab | 4000 | −95.3 | 1.2 |
| Antibody I | 60 | −36.2 | 9.7 |
| Antibody I | 200 | −21.4 | 15.2 |
| Antibody I | 600 | −73.1 | 4.9 |
| Antibody I | 2000 | −95.9 | 0.9 |
| Antibody I | 4000 | −96.6 | 0.8 |

TABLE 3-2

Neutralization of human IL-1β in vivo using Antibody II

| Molecules | Dose level (μg/kg) | % inhibition vs IgG4-PAA control | SE (of % inhibition) |
|---|---|---|---|
| IgG4-PAA control | 4000 | 0.0 | 16.0 |
| Canakinumab | 200 | −28.4 | 15.3 |
| Canakinumab | 600 | −80.9 | 2.0 |
| Canakinumab | 2000 | −94.3 | 0.3 |
| Canakinumab | 4000 | −96.8 | 0.3 |
| Antibody II | 60 | −54.1 | 5.0 |
| Antibody II | 200 | −44.0 | 10.6 |
| Antibody II | 600 | −81.2 | 1.5 |
| Antibody II | 2000 | −95.0 | 0.4 |
| Antibody II | 4000 | −97.7 | 0.4 |

Example 5: Binding Affinity Measurement of Antibody I and Antibody II by MSD-SET MSD (Meso Scale Discovery) electrochemiluminescence assay is utilized to measure the affinity of Antibody I, Antibody II, and Canakinumab against human IL-1β. First, the equilibrium mixture of antibodies and human IL-1β is set up; in the mixture the antibody, concentrations are kept constant at 1 pM, 10 pM, and 100 pM whereas the ligand is titrated in the concentration ranging from 0.9 nM to 0.00004 nM (2.5 times dilution between concentrations) The equilibrium mixture is set up in sealed non-binding 96-well plate at 37° C. for 72 hours.

MSD Gold Streptavidin plates are used to detect the free antibodies in the equilibrium mixture. The MSD plates are first blocked with blocking buffer (PBS+1% BSA) for 1 hour on a shaker set at 800 rpm and then washed 3 times with washing buffer PBST (PBS+0.05% Tween 20). The plates are coated with biotinylated human IL-1p followed by 3× washing with PBST. The equilibrium mixtures are added to the coated plate, incubated at room temperature with shaking for 2.5 mins and immediately washed 3× with PBST. The goat anti-human Sulfo-TAG antibody is added to the plate and incubated at room temperature for 1 hour with shaking. After three more washes, MSD Read Buffer at 1:2 concentration diluted in MilliQ water is added to the wells. immediately afterwards, the plates are read using an MSD Sector Imager 516000 instrument.

For data evaluation, the readout of the MSD instrument is imported into a customized Excel or GraphPad Prism 8-based evaluation program, which automatically plots the titration data, and calculates the $K_D$ values, as well as statistical parameters.

TABLE 4

Binding affinities for the antibodies (Ligand: Human IL-1β at 37° C.)

| | Affinity $K_D$ ± SE (pM) |
|---|---|
| Antibody I | 25.7 ± 0.2 |
| Antibody II | 22.5 ± 0.4 |
| Canakinumab | 13.1 ± 0.2 |

Example 6: Immunogenicity Risk Assessment

Antibody II is characterized for the relative risk of clinical immunogenicity using in silico and ex vivo methods via comparison to an antibody representative of U.S. Pat. No. 7,714,120 (herein US'120) and Canakinumab, as shown below.

Dendritic Cell (DC) Internalization Assay

This assay assesses the ability of human DCs to internalize tested antibodies. CD14+ cells are cultured and differentiated into immature DCs with IL-4 and GM-CSF. Tested antibodies, isotype control, or a positive control are pre-incubated with the detection agent (Fab-QSY7-TAMRA) in a 1:1 ratio to form a complex and then added to the cultures. Cells are incubated for one day. Upon internalization and cleavage, a positive TAMRA signal is detected by flow cytometry, and a normalized internalization index is calculated using IgG1-EN isotype control and anti-CXCR antibody.

MAPPS Assay (MHC-Associated Peptide Proteomics)

MAPPS profiles the MHC-II presented peptides on human dendritic cells previously treated with tested antibodies. CD14+ cells, isolated from the PBMCs of normal human donors, are cultured and differentiated into immature DCs by incubation with IL-4 and GM-CSF. On day 4, culture media is replaced with fresh media containing tested antibodies. On day 5, LPS is added to transform the cells into mature DCs. On day 6, cells are lysed in RIPA buffer with protease inhibitors. Immunoprecipitation of MHC-II complexes are performed using biotinlyated anti-MHC-II antibody coupled to streptavidin beads. The bound complex is eluted and filtered. The isolated MHC-II peptides are analyzed by a mass spectrometer. Peptide identifications are generated by an internal proteomics pipeline using search algorithms with no enzyme and a bovine/human database with test sequences appended to determine the percentage of donors displaying MHC-II peptides from complementarity determining regions of the test candidate. A KNIME workflow is used to process the identification files for the samples. Peptides identified from the test articles are aligned against the parent sequence.

In-Silico TCEM (T-Cell Exposed Motifs Analysis

This analysis assesses the likelihood that specific peptide clusters, identified by MAPPS, will activate CD4+ T cells. MAPPS-identified peptide sequences containing non-germline residues are inputed into an ImmunoEpitope Database (IEDB) Analysis Resource MHCII binding prediction page. The IEDB-recommended prediction method is selected. The prediction considers the 27 most frequent HLA-DR, -DP and -DQ alleles to cover a significant fraction of human population. Each input sequence, with a length equal or greater than 15 residues, is divided into overlapping 15-mers offset 1 amino acid to span the entire sequence. For each peptide, a percentile rank is generated by comparing the peptide's score against the scores of five million random 15 mers selected from SWISSPROT database. Amino acids located at the putative P-1, P2, P3, P5, P7, and P8 positions of the register generate the TCEM, and risk is defined on the basis of presence of non-germline residues at these positions. Non-germline residues and likelihood of the core binding to multiple alleles are reported in a graphic rendering and considered for immunogenicity risk assessment.

MS Serum Binding

This assay assesses off-target binding of test candidate to serum proteins. Tested antibodies are coated onto an Immulon 4 HBX microplate. Following blocking, human serum is added and incubated overnight. Bound proteins are eluted, reduced, alkylated, and digested. Peptides are analyzed by a mass spectrometer. Peptide and protein identifications are generated by an internal proteomics pipeline using search algorithms with tryptic enzyme and a human database with test antibody sequences appended. Ions are quantified by internal proteomics tools (Chrom-Alignment, Metaconsensus and Quant) and analyzed in JMP using Oneway analysis/ Each Pair, Student's t test platform. Analysis on log 2auc for ions using JMP: Fit Y by X per each ion/Compare Means/All pairs, Tukey HSD.

T Cell Proliferation Assay

This assay assesses the ability of tested antibodies or tested MAPPS peptides to activate CD4+ T cells by inducing cellular proliferation. CD8+ T cell depleted PBMC's are prepared and labeled with CFSE. Each sample is tested with media control, keyhole limpet haemocyanin (KLH; positive clinical benchmark control), tested antibodies, or tested MAPPS peptides. Cultures are incubated for 7 days. On day 7, samples are analyzed by flow cytometry.

Pre-Existing Reactivity (ACE-Bridge Format)

This assay assesses the presence of pre-existing antibodies against the tested antibodies in human serum. Diluted serum is captured overnight on a plate coated with biotinylated tested antibodies. On the following day, the captured reactive proteins are acid eluted, and then neutralized in the presence of biotinylated and ruthenylated tested antibodies. If anti-drug antibodies are present, they will bridge the labeled tested antibodies and form a complex. The complexes are captured by a streptavidin-coated Mesoscale plate, and the resulting signal is referred to as Tier 1 signal (expressed as electrochemiluminescence). This signal is confirmed in Tier 2 by adding excess unlabeled tested antibodies in the detection step, which results in the suppression of the Tier 1 signal. The presence of pre-existing anti-drug antibodies is expressed as magnitude of the $90^{th}$ percentile of Tier 2 inhibition.

TABLE 5

Immunogenicity Risk Assessment Summary

| Assay | Canakinumab | US'120 | Antibody II |
|---|---|---|---|
| DC internalization | Internalization index: 9.8 | Internalization index: 3.5 | Internalization index: 16.3 |
| MAPPS Assay 10 donors with diverse MHC | 100% donors display at least 1 of 3 non-germline clusters: H2 (10%), VHFR3 (90%), L2 (10%) | 70% donors display at least 1 of 4 non-germline clusters: H1 (40%), H2 (40%), L1 (10%), L2 (10%) | 20% donors display at least 1 of 2 non-germline clusters: H3: 10%, L2: 10% |
| In-silico TCEM analysis of MAPPS peptides | H2 contains 2 and L2 contains 1 non-germline T cell contact position(s) | All clusters contain at least 2-4 non-germline residues at T cell contact positions | H3 contains at least 2 and L2 contains 1 non-germline residues at T cell contact position(s) |

TABLE 5-continued

Immunogenicity Risk Assessment Summary

| Assay | Canakinumab | US'120 | Antibody II |
|---|---|---|---|
| MS Serum Binding Pool of 8-10 donors | No off-target binding detected | Entire initiating complement complex (C1q/r/s-C4) | No off-target binding detected |
| T Cell Proliferation Assay: protein 10 donors with diverse MHC | Not tested | Not tested | 0% Positive Donor Frequency (0/8 donors) |
| T Cell Proliferation Assay: MAPPs peptides 10 donors with diverse MHC | Not tested | Not tested | 40% positive donor for H3 (4/10 donors) |
| Pre-existing Reactivity 90$^{th}$ percentile T2 inhibition >50 donors | ACE-Bridge: 68% | ACE-Bridge: 19.5% | ACE-Bridge: 18.7% |

Abbreviations:
ACE = acid capture elution;
CDR = complementarity determining region;
DC = dendritic cell;
H1 = VH CDR1;
H2 = VH CDR2;
H3 = VH CDR3;
L1 = VL CDR1;
L2 = VL CDR2;
MAPPs = MHC-associated peptide proteomics;
MHC = major histocompatibility complex;
MS = mass spectrometry;
T2 = Tier 2;
TCEM = T cell exposed motif;
VH = variable heavy;
VL = variable light;
VHFR3 = variable heavy framework 3

Example 7: Epitope Mapping of Anti-Human IL-1β Antibody II

X-ray crystallography is used to obtain a high-resolution structure of IL-1β-Antibody II Fab complex. IL-1β SEQ ID NO:14 and Antibody II are expressed, purified, and mixed in order to form the IL1β-Antibody II Fab complex. The complex is crystallized using commonly known techniques. See Vonrhein, C. et al., *Biological Crystallography* 67, 293-302 (2011), Evans, P. R. & Murshudov, G. N., *Biological Crystallography* 69, 1204-1214 (2013), McCoy, A. J. *et al., Journal of Applied Crystallography* 40, 658-674 (2007), Emsley, P., Lohkamp, B., Scott, W. G. & Cowtan, K., *Biological Crystallography* 66, 486-501 (2010), Murshudov, G. N. et al., *Biological Crystallography* 67, 355-367 (2011), Winn, M. D. *et al., Biological Crystallography* 67, 235-242 (2011), and Williams, C. J. et al., *Protein Science* 27, 293-315 (2018).

The epitope shows IL-1β amino acid residues within 4.5 Å of residues on Antibody II include R120, E153, K219, E221, N224, M264, Q265, F266, and S268 (according to SEQ ID NO:1).

Amino Acid and Nucleotide Sequences

SEQ ID NO:1: (Human IL-1β proprotein or pro-hIL-1β)
MAEVPELASEMMAYYSGNEDDLFFEADGPKQMKCSFQDLDLCPLDGGIQ
LRISDHHYSKGFRQAASVVVAMDKLRKMLVPCPQTFQENDLSTFFPFIF
EEEPIFFDTWDNEAYVHDAPVRSLNCTLRDSQQKSLVMSGPYELKALHL -continued Amino Acid and Nucleotide Sequences QGQDMEQQVVFSMSFVQGEESNDKIPVALGLKEKNLYLSCVLKDDKPTL
QLESVDPKNYPKKKMEKRFVFNKIEINNKLEFESAQFPNWYISTSQAEN
MPVFLGGTKGGQDITDFTMQFVSS
SEQ ID NO:2: (HC of Antibody I and Antibody II)
X$_1$VQLVESGGGLVQPGGSLRLSCAASGFTFSDHYMSWIRQAPGKGLEWV
SYISSSGSTIYYADSVKGRFTISRDNAKNSLYLQMNSLRAEDTAVYYCA
READSSGYYYVGVDVWGQGTX$_2$VTVSSASTKGPSVFPLAPCSRSTSEST
AALGCLVKDYFPEPVTVSWNSGALTSGVHTFPAVLQSSGLYSLSSVVTV
PSSSLGTKTYTCNVDHKPSNTKVDKRVESKYGPPCPPCPAPEAAGGPSV
FLFPPKPKDTLMISRTPEVTCVVVDVSQEDPEVQFNWYVDGVEVHNAKT
KPREEQFNSTYRVVSVLTVLHQDWLNGKEYKCKVSNKGLPSSIEKTISK
AKGQPREPQVYTLPPSQEEMTKNQVSLTCLVKGFYPSDIAVEWESNGQP
ENNYKTTPPVLDSDGSFFLYSRLTVDKSRWQEGNVFSCSVMHEALHNHY
TQKSLSLSLG
Wherein X$_1$ is E or pE
Wherein X$_2$ is M or L SEQ ID NO: 3:(HC DNA of Antibody I and II)
gaggtgcagctggtggagtctgggggaggcttggtccagcctggggggt
ccctgaggctctcctgtgcagcctctggattcaccttcagtgaccacta
catgagctggatccgccaggctccagggaaggggctggagtgggtttca
tacattagtagtagtggtagtaccatatactacgcagactctgtgaagg
gccgattcaccatctccagggacaacgccaagaactcactgtatctgca
aatgaacagcctgagagccgaggacacggcggtgtactactgcgccaga
gaggctgacagcagcggatactactacgtgggcgtagacgtatggggtc
agggtacaatggtcaccgtctcctcagccagcaccaagggcccatcggt
cttcccactagcgccctgctccaggagcacctccgagagcacagccgcc
ctgggctgcctggtcaaggactacttccccgagccggtgacggtgtcgt
ggaactcaggagccctgaccagcggcgtgcacaccttcccggctgtcct
acagtcctcaggactctactccctcagcagcgtggtgaccgtgccctcc
agcagcttgggcacgaagacctacacctgcaacgtagatcacaagccca

| Amino Acid and Nucleotide Sequences |
|---|
| gcaacaccaaggtggacaagagagttgagtccaaatatggtcccccatg<br>cccaccctgcccagcacctgaggccgccgggggaccatcagtcttcctg<br>ttccccccaaaaccaaggacactctcatgatctcccggacccctgagg<br>taacgtgcgtggtggtggacgtgagccaggaagaccccgaggtccagtt<br>caactggtacgtggatggcgtggaggtgcataatgccaagacaaagccg<br>cgggaggagcagttcaacagcacgtaccgtgtggtcagcgtcctcaccg<br>tcctgcaccaggactggctgaacggcaaggagtacaagtgcaaggtctc<br>caacaaaggcctcccgtcctccatcgagaaaaccatctccaaagccaaa<br>gggcagccccgagagccacaggtgtacaccctgccccatcccaggagg<br>agatgaccaagaaccaggtcagcctgacctgcctggtcaaaggcttcta<br>ccccagcgacatcgccgtggagtgggaaagcaatgggcagccggagaa<br>aactacaagaccacgcctcccgtgctggactccgacggctccttcttcc<br>tctacagcaggctaaccgtggacaagaggcaggtggcaggaggggaatgt<br>cttctcatgctccgtgatgcatgaggctctgcacaaccactacacacag<br>aagagcctctccctgtctctgggt<br><br>SEQ ID NO:4: (LC of Antibody I and Antibody II)<br>DIQMTQSPSSLSASVGDRVTITCRASQSISSYLNWYQQKPGKAPKLLIY<br>GASSDQSGVPSRFSGSGSGTDFTLTISSLQPEDFATYYCQQGYYFPPTF<br>GGGTKVEIKRTVAAPSVFIFPPSDEQLKSGTASVVCLLNNFYPREAKVQ<br>WKVDNALQSGNSQESVTEQDSKDSTYSLSSTLTLSKADYEKHKVYACEV<br>THQGLSSPVTKSFNRGEC<br><br>SEQ ID NO:5: (LC DNA of Antibody I and Antibody II)<br>gacatccagatgacccagtctccatcctccctgtctgcatctgtaggag<br>acagagtcaccatcacttgccgggcaagtcagagcattagcagctattt<br>aaattggtatcagcagaaaccagggaaagcccctaagctcctgatctat<br>ggtgcatccagtgatcaaagtggggtcccatcaaggttcagtggcagtg<br>gatctgggacagatttcactctcaccatcagcagtctgcaacctgaaga<br>ttttgcaacttactactgtcagcaaggatactactttcctcctactttt<br>ggcggagggaccaaggttgagatcaaacgaaccgtggctgcaccatctg<br>tcttcatcttcccgccatctgatgagcagttgaaatctggaactgcctc<br>tgttgtgtgcctgctgaataacttctatcccagagaggccaaagtacag<br>tggaaggtggataacgccctccaatcgggtaactcccaggagagtgtca<br>cagagcaggacagcaaggacagcacctacagcctcagcagcaccctgac<br>gctgagcaaagcagactacgagaaacacaaagtctacgcctgcgaagtc<br>acccatcagggcctgagctcgcccgtcacaaagagcttcaacaggggag<br>agtgc<br><br>SEQ ID NO:6: (VH of Antibody I and Antibody II)<br>X₁VQLVESGGGLVQPGGSLRLSCAASGFTFSDHYMSWIRQAPGKGLEWV<br>SYISSSGSTIYYADSVKGRFTISRDNAKNSLYLQMNSLRAEDTAVYYCA<br>READSSGYYYVGVDVWGQGTX₂VTVSS<br>Wherein X₁ is E or pE<br>Wherein X₂ is M or L<br><br>SEQ ID NO:7: (HCDR1 of Antibody I and Antibody II)<br>AASGFTFSDHYMS<br><br>SEQ ID NO:8: (HCDR2 of Antibody I and Antibody II)<br>YISSSGSTIYYADSVKG<br><br>SEQ ID NO:9: (HCDR3 of Antibody I and Antibody II)<br>AREADSSGYYYVGVDV<br><br>SEQ ID NO: 10: (VL of Antibody I and Antibody II)<br>DIQMTQSPSSLSASVGDRVTITCRASQSISSYLNWYQQKPGKAPKLLIY<br>GASSDQSGVPSRFSGSGSGTDFTLTISSLQPEDFATYYCQQGYYFPPTF<br>GGGTKVEIK<br><br>SEQ ID NO: 11: (LCDR1 of Antibody I and Antibody II)<br>RASQSISSYLN<br><br>SEQ ID NO: 12: (LCDR2 of Antibody I and Antibody II)<br>YGASSDQS<br><br>SEQ ID NO: 13: (LCDR3 of Antibody I and Antibody II)<br>QQGYYFPPT<br><br>SEQ ID NO: 14 (Mature human IL-1β; residues 117-269 of SEQ ID NO: 1)<br>APVRSLNCTLRDSQQKSLVMSGPYELKALHLQGQDMEQQVVFSMSFVQG<br>EESNDKIPVALGLKEKNLYLSCVLKDDKPTLQLESVDPKNYPKKKMEKR<br>FVFNKIEINNKLEFESAQFPNWYISTSQAENMPVFLGGTKGGQDITDFT<br>MQFVSS<br><br>SEQ ID NO: 15 (HC of Antibody I)<br>X₁VQLVESGGGLVQPGGSLRLSCAASGFTFSDHYMSWIRQAPGKGLEWV<br>SYISSSGSTIYYADSVKGRFTISRDNAKNSLYLQMNSLRAEDTAVYYCA<br>READSSGYYYVGVDVWGQGTMVTVSSASTKGPSVFPLAPCSRSTSESTA<br>ALGCLVKDYFPEPVTVSWNSGALTSGVHTFPAVLQSSGLYSLSSVVTVP<br>SSSLGTKTYTCNVDHKPSNTKVDKRVESKYGPPCPPCPAPEAAGGPSVF<br>LFPPKPKDTLMISRTPEVTCVVVDVSQEDPEVQFNWYVDGVEVHNAKTK<br>PREEQFNSTYRVVSVLTVLHQDWLNGKEYKCKVSNKGLPSSIEKTISKA<br>KGQPREPQVYTLPPSQEEMTKNQVSLTCLVKGFYPSDIAVEWESNGQPE<br>NNYKTTPPVLDSDGSFFLYSRLTVDKSRWQEGNVFSCSVMHEALHNHYT<br>QKSLSLSLG<br>Wherein X₁ is E or pE<br><br>SEQ ID NO: 16 (HC of Antibody II)<br>X₁VQLVESGGGLVQPGGSLRLSCAASGFTFSDHYMSWIRQAPGKGLEWV<br>SYISSSGSTIYYADSVKGRFTISRDNAKNSLYLQMNSLRAEDTAVYYCA<br>READSSGYYYVGVDVWGQGTLVTVSSASTKGPSVFPLAPCSRSTSESTA<br>ALGCLVKDYFPEPVTVSWNSGALTSGVHTFPAVLQSSGLYSLSSVVTVP<br>SSSLGTKTYTCNVDHKPSNTKVDKRVESKYGPPCPPCPAPEAAGGPSVF<br>LFPPKPKDTLMISRTPEVTCVVVDVSQEDPEVQFNWYVDGVEVHNAKTK<br>PREEQFNSTYRVVSVLTVLHQDWLNGKEYKCKVSNKGLPSSIEKTISKA<br>KGQPREPQVYTLPPSQEEMTKNQVSLTCLVKGFYPSDIAVEWESNGQPE<br>NNYKTTPPVLDSDGSFFLYSRLTVDKSRWQEGNVFSCSVMHEALHNHYT<br>QKSLSLSLG<br>Wherein X₁ is E or pE<br><br>SEQ ID NO: 17: (VH of Antibody 1)<br>X₁VQLVESGGGLVQPGGSLRLSCAASGFTFSDHYMSWIRQAPGKGLEWV<br>SYISSSGSTIYYADSVKGRFTISRDNAKNSLYLQMNSLRAEDTAVYYCA<br>READSSGYYYVGVDVWGQGTMVTVSS<br>Wherein X₁ is E or pE<br><br>SEQ ID NO: 18: (VH of Antibody II)<br>X₁VQLVESGGGLVQPGGSLRLSCAASGFTFSDHYMSWIRQAPGKGLEWV<br>SYISSSGSTIYYADSVKGRFTISRDNAKNSLYLQMNSLRAEDTAVYYCA<br>READSSGYYYVGVDVWGQGTLVTVSS<br>Wherein X₁ is E or pE<br><br>SEQ ID NO: 19 (canakinumab HC)<br>QVQLVESGGGVVQPGRSLRLSCAASGFTFSVYGMNWVRQAPGKGLEWVA<br>IIWYDGDNQYYADSVKGRFTISRDNSKNTLYLQMNGLRAEDTAVYYCAR<br>DLRTGPFDYWGQGTLVTVSSASTKGPSVFPLAPCSRSTSESTAALGCLV<br>KDYFPEPVTVSWNSGALTSGVHTFPAVLQSSGLYSLSSVVTVPSSSLGT<br>KTYTCNVDHKPSNTKVDKRVESKYGPPCPPCPAPEAAGGPSVFLFPPKP<br>KDTLMISRTPEVTCVVVDVSQEDPEVQFNWYVDGVEVHNAKTKPREEQF<br>NSTYRVVSVLTVLHQDWLNGKEYKCKVSNKGLPSSIEKTISKAKGQPRE<br>PQVYTLPPSQEEMTKNQVSLTCLVKGFYPSDIAVEWESNGQPENNYKTT<br>PPVLDSDGSFFLYSRLTVDKSRWQEGNVFSCSVMHEALHNHYTQKSLSL<br>SLG<br><br>SEQ ID NO:20 (canakinumab LC)<br>EIVLTQSPDFQSVTPKEKVTITCRASQSIGSSLHWYQQKPDQSPKLLIK<br>YASQSFSGVPSRFSGSGSGTDFTLTINSLEAEDAAAYYCHQSSSLPFTF<br>GPGTKVDIKRTVAAPSVFIFPPSDEQLKSGTASVVCLLNNFYPREAKVQ<br>WKVDNALQSGNSQESVTEQDSKDSTYSLSSTLTLSKADYEKHKVYACEV<br>THQGLSSPVTKSFNRGEC |

We claim:

1. An antibody that binds human IL-1β protein comprising a heavy chain variable region (VH) and a light chain variable region (VL), wherein the VH comprises heavy chain complementarity determining regions (HCDR) HCDR1, HCDR2, and HCDR3, and the VL comprises light chain complementarity determining regions (LCDR) LCDR1, LCDR2, and LCDR3, wherein

```
                                            (SEQ ID NO:7)
    the HCDR1 comprises AASGFTFSDHYMS, (SEQ ID NO:8)
    the HCDR2 comprises YISSSGSTIYYADSVKG, (SEQ ID NO:9)
    the HCDR3 comprises AREADSSGYYYVGVDV, (SEQ ID NO:11)
    the LCDR1 comprises RASQSISSYLN, (SEQ ID NO:12)
    the LCDR2 comprises YGASSDQS, and (SEQ ID NO:13)
    the LCDR3 comprises QQGYYFPPT.
```

2. The antibody of claim 1, wherein the VH comprises SEQ ID NO:6 and the VL comprises SEQ ID NO:10.

3. The antibody of claim 1, wherein the VH comprises SEQ ID NO: 17 and the VL comprises SEQ ID NO:10.

4. The antibody of claim 1, wherein the VH comprises SEQ ID NO: 18 and the VL comprises SEQ ID NO: 10.

5. The antibody of claim 1, wherein the antibody comprises a heavy chain (HC) comprising SEQ ID NO:2 and a light chain (LC) comprising SEQ ID NO:4.

6. The antibody of claim 1, wherein the antibody comprises a heavy chain (HC) comprising SEQ ID NO:15 and a light chain (LC) comprising SEQ ID NO:4.

7. The antibody of claim 1, wherein the antibody comprises a heavy chain (HC) comprising SEQ ID NO:16 and a light chain (LC) comprising SEQ ID NO:4.

8. The antibody of claim 1, wherein the antibody comprises a heavy chain (HC) comprising amino acids 2-449 of SEQ ID NO:2, and a light chain (LC) comprising SEQ ID NO: 4.

9. The antibody of claim 1, wherein the antibody comprises a HC consisting of SEQ ID NO:2 and an LC consisting of SEQ ID NO:4.

10. The antibody of claim 1, wherein the antibody has a human IgG1 or IgG4 isotype.

11. The antibody of claim 10, wherein the antibody has a human IgG4 isotype.

12. A pharmaceutical composition comprising the antibody of claim 1, and a pharmaceutically acceptable excipient, diluent or carrier.

13. A nucleic acid comprising a sequence encoding SEQ ID NO:2 or 4.

14. A composition comprising
   (a) a vector comprising a first nucleic acid sequence encoding SEQ ID NO:2 and a second nucleic acid sequence encoding SEQ ID NO:4; or
   (b) a first vector comprising a nucleic acid sequence encoding SEQ ID NO:2 and a second vector comprising a nucleic acid sequence encoding SEQ ID NO:4.

15. A cell comprising
   (a) a vector comprising a first nucleic acid sequence encoding SEQ ID NO:2 and a second nucleic acid sequence encoding SEQ ID NO:4; or
   (b) a first vector comprising a nucleic acid sequence encoding SEQ ID NO:2 and a second vector comprising a nucleic acid sequence encoding SEQ ID NO:4.

16. The cell of claim 15, wherein the cell is a mammalian cell.

17. A process of producing an antibody comprising culturing the cell of claim 15 under conditions such that the antibody is expressed and recovering the expressed antibody from the culture medium.

18. An antibody produced by culturing the cell of claim 15 under conditions such that the antibody is expressed and recovering the expressed antibody from the culture medium.

19. A method of treating inflammatory disease related to human IL-1b in a subject in need thereof, comprising administering to the subject a therapeutically effective amount of the antibody of claim 1.

20. The method of claim 19 wherein the inflammatory disease is Muckle Wells Syndrome (MWS), cryopyrin-associated periodic syndrome (CAPS), neonatal-onset multisystem inflammatory syndrome (NOMIS), rheumatoid arthritis, systemic-onset juvenile idiopathic arthritis (soJIA), gout arthritis, chronic obstructive pulmonary disease (COPD), Type 1 diabetes, Type 2 diabetes, familial cold auto-inflammatory syndrome (FCAS), or age-related macular degeneration.

21. A method of treating cardiovascular disease in a subject in need thereof, comprising administering to the subject a therapeutically effective amount of the antibody of claim 1.

22. The method of claim 21 wherein the cardiovascular disease is angina, myocardial infarction (MI), stroke, heart failure, or arrythmia.

23. A method of treating cancer in a subject in need thereof, comprising administering to the subject a therapeutically effective amount of the antibody of claim 1.

24. The method of claim 23 wherein the cancer is non-small cell lung cancer (NSCLC), triple negative breast cancer (TNBC), metastatic prostate cancer, low-risk myeloidoplastic leukemia, intermediate-risk myeloidoplastic leukemia, or localized kidney cancer.

* * * * *